United States Patent
Nourai et al.

(10) Patent No.: US 10,861,130 B2
(45) Date of Patent: *Dec. 8, 2020

(54) MIXED REALITY SYSTEM WITH VIRTUAL CONTENT WARPING AND METHOD OF GENERATING VIRTUAL CONTENT USING SAME

(71) Applicant: MAGIC LEAP, INC., Plantation, FL (US)

(72) Inventors: Reza Nourai, Danville, CA (US); Robert Blake Taylor, Porter Ranch, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/848,496

(22) Filed: Apr. 14, 2020

(65) Prior Publication Data
US 2020/0242729 A1 Jul. 30, 2020

Related U.S. Application Data

(63) Continuation of application No. 15/924,011, filed on Mar. 16, 2018, now Pat. No. 10,769,752.
(Continued)

(51) Int. Cl.
*G09G 5/00* (2006.01)
*G06T 3/00* (2006.01)
(Continued)

(52) U.S. Cl.
CPC .......... *G06T 3/0093* (2013.01); *G06T 15/205* (2013.01); *G06T 15/40* (2013.01);
(Continued)

(58) Field of Classification Search
CPC ................. G06T 15/40–15/405; G06T 19/006
See application file for complete search history.

(56) References Cited

U.S. PATENT DOCUMENTS

| 4,462,165 A | 7/1984 | Lewis |
| 5,280,265 A | 1/1994 | Kramer et al. |

(Continued)

FOREIGN PATENT DOCUMENTS

| CA | 2358682 | 3/1994 |
| CN | 101093586 | 12/2007 |

(Continued)

OTHER PUBLICATIONS

Non-Final Office Action for U.S. Appl. No. 14/641,376 dated Apr. 14, 2016.
(Continued)

*Primary Examiner* — Charles Tseng
(74) *Attorney, Agent, or Firm* — Vista IP Law Group LLP

(57) ABSTRACT

A computer implemented method for warping virtual content includes generating warped virtual content by transforming source virtual content. The method also includes determining whether a memory location corresponding to an X, Y location of the warped virtual content in an output frame of reference is occupied by pre-existing virtual content. The method further includes storing the warped virtual content in the memory location if the memory location is not occupied. Moreover, the method includes comparing respective Z locations of the warped virtual content and the pre-existing virtual content to identify virtual content with a Z location closer to a viewing location if the memory location is occupied. The method also includes storing the warped virtual content in the memory location corresponding to the X, Y location if a Z location of warped virtual content is closer to the viewing location than a pre-existing Z location of pre-existing virtual content.

20 Claims, 9 Drawing Sheets

Related U.S. Application Data

(60) Provisional application No. 62/472,985, filed on Mar. 17, 2017.

(51) Int. Cl.

| | | |
|---|---|---|
| *G06T 17/10* | (2006.01) | |
| *G06T 19/00* | (2011.01) | |
| *G06T 15/40* | (2011.01) | |
| *G06T 15/20* | (2011.01) | |

(52) U.S. Cl.
CPC ............ *G06T 17/10* (2013.01); *G06T 19/006* (2013.01); *G06T 2210/44* (2013.01)

(56) References Cited

U.S. PATENT DOCUMENTS

| | | |
|---|---|---|
| 5,583,974 A | 12/1996 | Winner et al. |
| 5,592,401 A | 1/1997 | Kramer |
| 5,684,498 A | 11/1997 | Welch et al. |
| 5,784,115 A | 7/1998 | Bozdagi |
| 5,930,741 A | 7/1999 | Kramer |
| 6,377,401 B1 | 4/2002 | Bartlett |
| 6,407,736 B1 | 6/2002 | Regan |
| 6,701,296 B1 | 3/2004 | Kramer et al. |
| 7,375,529 B2 | 5/2008 | Dupuis et al. |
| 7,443,154 B1 | 10/2008 | Merewether et al. |
| 8,165,352 B1 | 4/2012 | Mohanty et al. |
| 8,401,308 B2 | 3/2013 | Nakamura et al. |
| 8,950,867 B2 | 2/2015 | Macnamara |
| 9,013,505 B1 | 4/2015 | Thorton |
| 9,160,727 B1 | 10/2015 | Saylor et al. |
| 9,215,293 B2 | 12/2015 | Miller |
| 9,417,452 B2 | 8/2016 | Schowengerdt et al. |
| 9,465,129 B1 | 10/2016 | Olsson et al. |
| 9,639,935 B1 | 5/2017 | Douady-Plevin et al. |
| 9,671,566 B2 | 6/2017 | Abovitz et al. |
| 9,791,700 B2 | 10/2017 | Schowengerdt |
| 9,814,430 B1 | 11/2017 | Berme et al. |
| 9,874,749 B2 | 1/2018 | Bradski et al. |
| 9,952,673 B2 | 4/2018 | Kramer et al. |
| 2001/0043738 A1 | 11/2001 | Sawney et al. |
| 2002/0033803 A1 | 3/2002 | Holzrichter et al. |
| 2002/0180727 A1 | 12/2002 | Guckenberger et al. |
| 2003/0092448 A1 | 5/2003 | Forstrom et al. |
| 2003/0120448 A1 | 7/2003 | Moriya et al. |
| 2003/0234823 A1 | 12/2003 | Sato et al. |
| 2004/0140949 A1 | 7/2004 | Takagi |
| 2004/0174337 A1 | 9/2004 | Kubota et al. |
| 2004/0201857 A1 | 10/2004 | Foxlin |
| 2005/0107870 A1 | 5/2005 | Wang et al. |
| 2005/0156601 A1 | 7/2005 | Dupuis et al. |
| 2006/0161871 A1 | 7/2006 | Hotelling et al. |
| 2006/0253804 A1 | 11/2006 | Fukushima et al. |
| 2007/0049374 A1 | 3/2007 | Ikeda et al. |
| 2007/0072674 A1 | 3/2007 | Ohta et al. |
| 2007/0126733 A1 | 6/2007 | Yang et al. |
| 2007/0298883 A1 | 12/2007 | Feldman et al. |
| 2008/0024523 A1 | 1/2008 | Tomite et al. |
| 2008/0133521 A1 | 6/2008 | Podilchuk |
| 2008/0275667 A1 | 11/2008 | Ohta |
| 2008/0309884 A1 | 12/2008 | O'Dor et al. |
| 2009/0005166 A1 | 1/2009 | Sato |
| 2009/0051653 A1 | 2/2009 | Barney et al. |
| 2009/0115406 A1 | 5/2009 | Anderson et al. |
| 2009/0173886 A1 | 7/2009 | Chowdhury |
| 2009/0184825 A1 | 7/2009 | Anderson |
| 2010/0066676 A1 | 3/2010 | Kramer et al. |
| 2010/0085423 A1 | 4/2010 | Lange |
| 2010/0103205 A1 | 4/2010 | Lisaka et al. |
| 2010/0141261 A1 | 7/2010 | Overby et al. |
| 2010/0302152 A1 | 12/2010 | Kirigaya |
| 2010/0309292 A1 | 12/2010 | Ho et al. |
| 2011/0018874 A1 | 1/2011 | Hasselgreen et al. |
| 2011/0025603 A1 | 2/2011 | Underkoffler et al. |
| 2011/0184950 A1 | 7/2011 | Skaff et al. |
| 2011/0199088 A1 | 8/2011 | Bittar et al. |
| 2011/0238399 A1 | 9/2011 | Ophir et al. |
| 2011/0248987 A1 | 10/2011 | Mitchell |
| 2011/0298748 A1 | 12/2011 | Chen et al. |
| 2012/0099800 A1 | 4/2012 | Llano et al. |
| 2012/0117076 A1 | 5/2012 | Austermann et al. |
| 2012/0194516 A1 | 8/2012 | Newcombe et al. |
| 2012/0236030 A1 | 9/2012 | Border et al. |
| 2012/0328196 A1 | 12/2012 | Kasahara et al. |
| 2013/0084984 A1 | 4/2013 | Gagner et al. |
| 2013/0117377 A1 | 5/2013 | Miller |
| 2013/0128230 A1 | 5/2013 | Macnamara |
| 2013/0169626 A1 | 7/2013 | Balan et al. |
| 2013/0230211 A1 | 9/2013 | Tanabiki et al. |
| 2013/0241773 A1 | 9/2013 | Laine |
| 2013/0278635 A1 | 10/2013 | Maggiore |
| 2013/0290222 A1 | 10/2013 | Gordo et al. |
| 2013/0312009 A1 | 11/2013 | Kramer et al. |
| 2013/0321462 A1 | 12/2013 | Salter et al. |
| 2013/0346168 A1 | 12/2013 | Zhou et al. |
| 2014/0006026 A1 | 1/2014 | Lamb et al. |
| 2014/0011589 A1 | 1/2014 | Barney et al. |
| 2014/0037140 A1 | 2/2014 | Benhimane et al. |
| 2014/0062841 A1 | 3/2014 | Ishikawa et al. |
| 2014/0075060 A1 | 3/2014 | Sharp et al. |
| 2014/0139226 A1 | 5/2014 | Jaaskelainen et al. |
| 2014/0145932 A1 | 5/2014 | Underkoffler et al. |
| 2014/0176591 A1 | 6/2014 | Klein et al. |
| 2014/0181587 A1 | 6/2014 | Sridharan et al. |
| 2014/0195988 A1 | 7/2014 | Kramer et al. |
| 2014/0212027 A1 | 7/2014 | Hallquist et al. |
| 2014/0222409 A1 | 8/2014 | Efrat et al. |
| 2014/0225822 A1 | 8/2014 | Underkoffler et al. |
| 2014/0267420 A1 | 9/2014 | Schowengerdt et al. |
| 2014/0267646 A1 | 9/2014 | Na'Aman et al. |
| 2014/0285375 A1 | 9/2014 | Crain |
| 2014/0298269 A1 | 10/2014 | Underkoffler et al. |
| 2014/0306866 A1 | 10/2014 | Miller et al. |
| 2014/0321702 A1 | 10/2014 | Schmalstieg |
| 2014/0323148 A1 | 10/2014 | Schmalstieg et al. |
| 2014/0325373 A1 | 10/2014 | Kramer et al. |
| 2014/0354548 A1 | 12/2014 | Lee |
| 2015/0002542 A1 | 1/2015 | Chan et al. |
| 2015/0016777 A1 | 1/2015 | Abovitz et al. |
| 2015/0019651 A1 | 1/2015 | Kazi et al. |
| 2015/0040074 A1 | 2/2015 | Hofmann et al. |
| 2015/0077326 A1 | 3/2015 | Kramer et al. |
| 2015/0092015 A1 | 4/2015 | Stafford |
| 2015/0100380 A1 | 4/2015 | Jones, Jr. et al. |
| 2015/0100593 A1 | 4/2015 | Underkoffler et al. |
| 2015/0161476 A1 | 6/2015 | Kurz et al. |
| 2015/0163345 A1 | 6/2015 | Cornaby et al. |
| 2015/0172568 A1 | 6/2015 | Choe et al. |
| 2015/0177831 A1 | 6/2015 | Chan et al. |
| 2015/0178554 A1 | 6/2015 | Kanaujia et al. |
| 2015/0178939 A1 | 6/2015 | Bradski et al. |
| 2015/0205126 A1 | 7/2015 | Schowengerdt |
| 2015/0205364 A1 | 7/2015 | Underkoffler et al. |
| 2015/0205388 A1 | 7/2015 | Osterhout |
| 2015/0215611 A1 | 7/2015 | Wu et al. |
| 2015/0221133 A1 | 8/2015 | Groten et al. |
| 2015/0234477 A1 | 8/2015 | Abovitz et al. |
| 2015/0243080 A1 | 8/2015 | Steinbach et al. |
| 2015/0262372 A1 | 9/2015 | Cardoso et al. |
| 2015/0301592 A1 | 10/2015 | Miller |
| 2015/0302652 A1 | 10/2015 | Miller et al. |
| 2015/0309264 A1 | 10/2015 | Abovitz et al. |
| 2015/0310310 A1 | 10/2015 | Hesch |
| 2015/0324198 A1 | 11/2015 | Alsup et al. |
| 2015/0339857 A1 | 11/2015 | O'Connor et al. |
| 2015/0346495 A1 | 12/2015 | Welch et al. |
| 2015/0358539 A1 | 12/2015 | Catt |
| 2015/0371082 A1 | 12/2015 | Csaszar et al. |
| 2015/0373369 A1 | 12/2015 | Jalai et al. |
| 2015/0379772 A1 | 12/2015 | Hoffman |
| 2016/0005233 A1 | 1/2016 | Fraccaroli et al. |
| 2016/0012643 A1 | 1/2016 | Kezele et al. |
| 2016/0016752 A1 | 1/2016 | Helseth et al. |
| 2016/0018896 A1 | 1/2016 | Kramer et al. |

(56) References Cited

U.S. PATENT DOCUMENTS

| | | | |
|---|---|---|---|
| 2016/0026253 | A1 | 1/2016 | Bradski et al. |
| 2016/0041048 | A1 | 2/2016 | Blum et al. |
| 2016/0147065 | A1 | 5/2016 | Border et al. |
| 2016/0171644 | A1 | 6/2016 | Gruber |
| 2016/0180151 | A1 | 6/2016 | Philbin et al. |
| 2016/0180592 | A1 | 6/2016 | Bean et al. |
| 2016/0189680 | A1 | 6/2016 | Paquette |
| 2016/0203624 | A1 | 7/2016 | Anderson |
| 2016/0210783 | A1 | 7/2016 | Tomlin et al. |
| 2016/0259032 | A1 | 9/2016 | Hehn |
| 2016/0259404 | A1 | 9/2016 | Woods |
| 2016/0262608 | A1 | 9/2016 | Krueger |
| 2016/0282619 | A1 | 9/2016 | Oto |
| 2016/0294958 | A1 | 10/2016 | Zhang et al. |
| 2016/0299567 | A1 | 10/2016 | Crisler et al. |
| 2016/0327789 | A1 | 11/2016 | Klug et al. |
| 2016/0378863 | A1 | 12/2016 | Shlens et al. |
| 2016/0379092 | A1 | 12/2016 | Kutliroff |
| 2017/0011555 | A1 | 1/2017 | Li et al. |
| 2017/0032220 | A1 | 2/2017 | Medasani et al. |
| 2017/0076328 | A1 | 3/2017 | Suzuki |
| 2017/0098406 | A1 | 4/2017 | Kobayashi |
| 2017/0109916 | A1 | 4/2017 | Kurz et al. |
| 2017/0148206 | A1 | 5/2017 | Donner et al. |
| 2017/0161853 | A1 | 6/2017 | Gossweiler et al. |
| 2017/0161919 | A1 | 6/2017 | Schroeder |
| 2017/0184387 | A1 | 6/2017 | Lefevre et al. |
| 2017/0205903 | A1 | 7/2017 | Miller et al. |
| 2017/0243324 | A1 | 8/2017 | Mierle et al. |
| 2017/0345220 | A1 | 11/2017 | Bates |
| 2017/0345398 | A1 | 11/2017 | Fuchs et al. |
| 2018/0039083 | A1 | 2/2018 | Miller et al. |
| 2018/0047332 | A1 | 2/2018 | Kuwahara |
| 2018/0107346 | A1 | 4/2018 | Wilson |
| 2018/0213359 | A1 | 7/2018 | Reinhardt et al. |
| 2018/0267309 | A1 | 9/2018 | Klug et al. |
| 2018/0268518 | A1 | 9/2018 | Nourai et al. |
| 2018/0268519 | A1 | 9/2018 | Liebenow et al. |
| 2018/0268610 | A1 | 9/2018 | Nourai et al. |
| 2018/0365882 | A1 | 12/2018 | Croxsford et al. |
| 2019/0015167 | A1 | 1/2019 | Draelos et al. |
| 2019/0056693 | A1 | 2/2019 | Gelman et al. |
| 2019/0066365 | A1 | 2/2019 | Schmalstieg et al. |
| 2019/0155374 | A1 | 5/2019 | Miller et al. |
| 2019/0333263 | A1 | 10/2019 | Melkote Krishnaprasad et al. |
| 2019/0355176 | A1 | 11/2019 | Evans |
| 2020/0005517 | A1 | 1/2020 | Anderson et al. |
| 2020/0027194 | A1 | 1/2020 | Nourai et al. |
| 2020/0184712 | A1 | 6/2020 | Schmalstieg et al. |

FOREIGN PATENT DOCUMENTS

| | | |
|---|---|---|
| CN | 101530325 | 9/2009 |
| CN | 103792661 | 5/2014 |
| CN | 104011788 | 8/2014 |
| EP | 2887311 | 6/2015 |
| KR | 10-2014-0034252 | 3/2014 |
| KR | 10-2016-0013939 | 2/2016 |
| KR | 10-2016-0023888 | 2/2016 |
| WO | WO 94/04938 | 3/1994 |
| WO | WO 2009/091563 | 7/2009 |
| WO | WO 2014/160342 | 10/2014 |
| WO | WO 2015134958 | 9/2015 |
| WO | WO 2016141373 | 9/2016 |
| WO | WO 2017096396 | 6/2017 |
| WO | WO 2017136833 | 8/2017 |
| WO | WO 9720244 | 12/2019 |
| WO | WO 2020/023383 | 1/2020 |

OTHER PUBLICATIONS

Response to Non-Final office action filed Sep. 12, 2016 for U.S. Appl. No. 14/641,376.
Final Office Action for U.S. Appl. No. 14/641,376 dated Nov. 14, 2016.
Response to Final Office action filed Mar. 14, 2017 for U.S. Appl. No. 14/641,376.
PCT International Search Report and Written Opinion for International Appln. No. PCT/US15/19339, Applicant Magic Leap, Inc., Forms PCT/ISA/210, 220, and 237, dated Jun. 24, 2015 (10 pages).
PCT International Search Report and Written Opinion for International Appln. No. PCT/US16/21095, Applicant Magic Leap, Inc., forms PCT/ISA/210, 220, and 237, dated May 31, 2016 (12 pages).
PCT International Search Report and Written Opinion for International Appln. No. PCT/US16/65001, Applicant Magic Leap, Inc., forms PCT/ISA/210, 220, and 237, dated Feb. 16, 2017 (16 pages).
PCT International Search Report and Written Opinion for International Appln. No. PCT/US2017/016722, Applicant Magic Leap, Inc., forms PCT/ISA/210, 220, and 237, dated Apr. 14, 2017 (24 pages).
Notice of Allowance dated Aug. 14, 2017 for U.S. Appl. No. 14/641,376.
Preliminary Amendment filed Aug. 24, 2017 for U.S. Appl. No. 15/425,837.
Non-Final Office Action dated Dec. 6, 2017 for U.S. Appl. No. 15/062,104.
Voluntary Amendment for Canadian Appln. No. 2979560 filed Oct. 6, 2017, 24 pages.
Voluntary Amendment for Japanese Appln. No. 2017-546703 filed Nov. 7, 2017, 7 pages.
Response to Non-Final office action filed Mar. 6, 2018 for U.S. Appl. No. 15/062,104.
Final Office Action filed Apr. 30, 2018 for U.S. Appl. No. 15/062,104.
Coiliot, C., Moutoussamy, J., Boda, M., and Leroy, P.: New ferromagnetic core shapes for induction sensors, J. Sens. Sens. Syst., 3,1-8, https://doi.org/10.5194/jsss-3-1-2014, 2014.
Non-Final Office Action dated Apr. 5, 2018 for U.S. Appl. No. 15/425,837.
Response to Non-Final Office Action filed Jul. 5, 2018 for U.S. Appl. No. 15/425,837.
Pre appeal brief filed Aug. 30, 2018 for U.S. Appl. No. 15/062,104.
Notice of Allowance dated Sep. 6 2018 for U.S. Appl. No. 15/425,837.
Extended European Search Report dated Oct. 16, 2018 for EP Application No. 16759643.6.
Amendment After Allowance dated Nov. 15, 2018 for U.S. Appl. No. 15/425,837.
Non final Office Action dated Nov. 29, 2018 for U.S. Appl. No. 15/369,646.
Extended European Search Report dated Jan. 7, 2019 for EP Application No. 16871733.8.
Song Yafei et al.: Fast Estimation of Relative Poses for 6-DOF Image Localization, 2015 IEEE International Conference on Multimedia Big Data, IEEE; Apr. 20, 2015, pp. 156-163, XP033173496.
Ng Joe Yue-Hei et al.: Exploiting local features from deep networks for image retrieval, 2015 IEEE Conference on Computer Vision and Pattern recognition workshops (CVPRW), IEEE; Jun. 7, 2015, pp. 53-61, XP032795533.
Bay Herbert et al.: SURF: Speeded Up Robust Features, International Conference on Simulation, Modeling and Programming for Autonomous Robots, Simpar 2010, Lecture Notes in Computer Science; Lect Notes Computer; May 7, 2006, pp. 404-417, XP047429677.
Alex Kendall et al.: PoseNet: A Convolutional Metwork for Real-Time 6-DOF Camera Relocalization,https://arxiv.org/pdf/1505.07427v3.pdf, Nov. 23, 2015; XP055536871.
Extended European Search Report dated Jan. 17, 2019 for EP Application No. 17748352.6.
Nair Rahul et al.: "A Survey on Time-of-Flight Stero Fusion", Oct. 9, 2015, Medical Image Computing and Computer Assisted Intervention—MICCAI 2015, 18th International Conference, Munich, Germany, Oct. 5-9, 2015; Proceedings; Lecture Notes in Computer Science; Lect Notes Computer; Springer International Publishing, CH, XP047148654.

(56) References Cited

OTHER PUBLICATIONS

Zhu J J et al.: Joint depth and alpha matte optimization via fusion of stero and time-of-flight sensor, 2009 IEEE Conference on Computer Vision and Pattern recognition (CVPR), IEEE; Jun. 20, 2009, pp. 453-460, XP002700137.
Amendment After Non-Final Office Action dated Feb. 28, 2019 for U.S. Appl. No. 15/369,646.
PCT International Search Report and Written Opinion for International Appln. No. PCT/US18/22884, Applicant Magic Leap, Inc., forms PCT/ISA/210, 220, and 237, dated May 21, 2018 (13 pages).
Non-Final Office Action for U.S. Appl. No. 15/923,560 dated Jan. 2, 2019.
Amendment Response to Non-Final Office Action for U.S. Appl. No. 15/923,560 dated Apr. 1, 2019.
PCT International Search Report and Written Opinion for International Appln. No. PCT/US18/22993, Applicant Magic Leap, Inc., forms PCT/ISA/210, 220, and 237, dated Jun. 8, 2018 (13 pages).
PCT Invitation to Pay Additional Fees for International Appln. No. PCT/US18/23011, Applicant Magic Leap, Inc. dated May 25, 2018 (18 pages).
PCT International Search Report and Written Opinion for International Appln. No. PCT/US18/23011, Applicant Magic Leap, Inc. dated Jul. 23, 2018 (18 pages).
Non-Final Office Action for U.S. Appl. No. 15/924,078 dated Mar. 21, 2019.
Reply brief filed May 6, 2019 for U.S. Appl. No. 15/062,104.
Response to Extended European Search Report dated May 13, 2019 for EP Application No. 16759643.6.
Non Final Office action dated Jun. 17, 2019 for U.S. Appl. No. 15/924,011.
Tian et al., View Synthesis Techniques for 3D Video, Proc. SPIE 7443, Applications of Digital Image Processing XXXII, 74430T, Sep. 2009 (Year: 2009).
Final Office Action dated Jun. 21, 2019 for U.S. Appl. No. 15/369,646.
Response to Non-Final Office Action filed Jun. 21, 2019 for U.S. Appl. No. 15/924,078.
Response to Restriction Requirement filed Jul. 22, 2019 for U.S. Appl. No. 15/877,359.
Final Office Action for U.S. Appl. No. 15/923,560 dated Jul. 11, 2019.
Non-Final Office Action for U.S. Appl. No. 15/665,335 dated Apr. 22, 2019.
Response to Non-Final Office Action for U.S. Appl. No. 15/665,335 dated Jul. 22, 2019.
Response to Restriction Requirement filed Mar. 18, 2019 for U.S. Appl. No. 15/665,335.
PCT International Search Report and Written Opinion for International Patent Appln. No. PCT/US2017/044762 dated Oct. 5, 2017 (8 pages).
Response to Extended European Search Report dated Jul. 30, 2019 for European Application No. 16871733.8, (12 pages).
Final Office Action for U.S. Appl. No. 15/924,078 dated Aug. 9, 2019.
Response to Final Office Action and AFCP for U.S. Appl. No. 15/369,646, filed Aug. 21, 2019.
Response Non Final Office action filed Sep. 12, 2019 for U.S. Appl. No. 15/924,011.
Advisory Action dated Sep. 6, 2019 for U.S. Appl. No. 15/369,646.
RCE and Response to Final Office Action for U.S. Appl. No. 15/369,646, filed Sep. 19, 2019.
Office Action for Chinese Appln. No. 201680025479.1 dated Jul. 23, 2019, 16 pages w/English translation.
Response to Final Office Action and AFCP for U.S. Appl. No. 15/924,078, filed Oct. 9, 2019.
Response to Final Office Action for U.S. Appl. No. 15/923,560, filed Oct. 10, 2019.
1st Examination Report dated Oct. 1, 2019 for European Application No. 16759643.6.
Non-Final Office Action dated Oct. 21, 2019 for U.S. Appl. No. 15/877,359.
Final office action dated Oct. 22, 2019 for U.S. Appl. No. 15/924,011.
Advisory Action dated Oct. 22, 2019 for U.S. Appl. No. 15/924,078.
Non-Final Office Action dated Oct. 30, 2019 for U.S. Appl. No. 16/220,617.
Non-Final Office Action dated Oct. 31, 2019 for U.S. Appl. No. 15/923,560.
RCE and Response to Final Office Action filed Nov. 11, 2019 for U.S. Appl. No. 15/924,078.
Non Final Office Action dated Nov. 8, 2019 for U.S. Appl. No. 15/369,646.
Final office action dated Aug. 9, 2019 for for U.S. Appl. No. 15/924,078.
Office Action for Israeli Appln. No. 254300 dated Oct. 27, 2019, 7 pages w/English translation.
Response to Office Action for Chinese Appln. No. 201680025479.1 filed Nov. 26, 2019, 9 pages w/English translation of claims.
Extended European Search Report dated Nov. 21, 2019 for European Application No. 18767086.4.
Extended European Search Report for European Appln. No. 17837488.0 dated Jul. 11, 2019 (10 pages).
Robert Earl Patterson, et al. "Low-Level Factors in Human Factors of Stereoscopic 3D Displays", ProQuest Ebook Central, Springer, London, Dec. 29, 2014. doi:10.1007/978-1-4471-6651-1_4, chapter 4.2; 4.3.
Jannick Rolland, et al. "The past, present and future of head-mounted display designs"; Nov. 8, 2004, Proc. SPIE 5638, p. 368.
RCE and Response to Final Office Action for U.S. Appl. No. 15/665,335, filed Dec. 4, 2019.
PCT International Search Report and Written Opinion for International Patent Appln. No. PCT/US2019/042819, dated Dec. 4, 2019 (12 pages).
PCT Invitation to Pay Additional Fees for International Patent Appln. No. PCT/US2019/042819, dated Sep. 18, 2019 (2 pages).
Lee, Y., et al., "Estimating Gaze Depth Using Multi-Layer Perceptron," Published by IEEE, retrived electronically on Apr. 12, 2019 (5 pages).
Extended European Search Report for European Appln. No. 18766694.6 dated Nov. 21, 2019 (9 pages).
Theohari S Theohari S et al. "The Magic of the Z-Buffer: A Survey", Journal of WSCG, Plzen, Czech Republic, Feb. 5, 2001, XP55640849.
Amir H. Behzadan et al: "Scalable 1-14 Algorithm for Resolving Incorrect Occlusion in Dynamic Augmented Reality Engineering Environments : Scalable algorithm for resolving incorrect occlusion", Computer-Aided Civil and Infrastructure Engineering, vol. 25, No. I, Jan. 1, 2010, pp. 319, XP55640847.
Breen D E et al: "Interactive occlusion 1-14 and automatic object placement for augmented reality", Computer Graphics Forum, Wiley-Blackwell Publishing Ltd, GB, vol. 15, No. 3, Aug. 26, 1996, pp. 11-22, XP002515919.
Mark WR et al: "Post-Rendering 3D 1-14 Warping", Proceedings of 1997 Symposium on Interactive 3 D Graphics Apr. 27-30, 1997 Providence, RI, USA; ACM, New York, NY, USA, Apr. 27, 1997, pp. 7-16, XP000725355.
Amendment After Final Office Action for U.S. Appl. No. 15/924,011 dated Dec. 19, 2019.
Non-Final Office Action for U.S. Appl. No. 16/22,630 dated Dec. 26, 2019.
Non-Final Office Action for U.S. Appl. No. 15/924,078 dated Jan. 13, 2020.
Extended European Search Report for European Appln. No. 18742228.2 dated Jan. 13, 2020 (8 pages).
Amendment After non-final Office Action for U.S. Appl. No. 15/877,359 dated Jan. 21, 2020.
Notice of Allowance for U.S. Appl. No. 15/924,011 dated Jan. 23, 2020.
Response to Extended European Search Report for European Appln. No. 17837488.0 filed Jan. 28, 2020 (23 pages).
Amendment After non-final Office Action for U.S. Appl. No. 16/220,617 dated Jan. 30, 2020.
Amendment After non-final Office Action for U.S. Appl. No. 15/923,560 dated Jan. 31, 2020.
Response to Examination Report filed Feb. 11, 2020 for European Application No. 16759643.6.

(56) References Cited

OTHER PUBLICATIONS

Amendment After non-final Office Action for U.S. Appl. No. 15/369,646 dated Feb. 10, 2020.
Notice of Allowance for U.S. Appl. No. 16/220,617 dated Feb. 20, 2020.
Response to Office Action filed Feb. 20, 2020 for Israeli Patent Application No. 254300, (3 pages).
Foreign Office Action for Japanese Patent Appln. No. 2017-546703 dated Mar. 10, 2020.
Amendment After non-final Office Action for U.S. Appl. No. 15/924,078 dated Apr. 13, 2020.
Notice of Allowance for U.S. Appl. No. 15/369,646 dated Apr. 8, 2020.
Final Office Action for U.S. Appl. No. 15/877,359 dated Apr. 16, 2020.
Foreign Office Action for Israeli Patent Application No. 259766 dated Mar. 1, 2020.
Amendment After non-final Office Action for U.S. Appl. No. 16/220,630 dated Apr. 27, 2020.
Notice of Allowance for U.S. Appl. No. 15/923,560 dated May 19, 2020.
Notice of Allowance for U.S. Appl. No. 15/924,078 dated May 18, 2020.
Foreign Office Action for CN Patent Appln. No. 201680025479.1 dated Apr. 7, 2020.
Jiang, P., etc., "Electro-magnetic Tracking System for Capsule-typed Telemetric Device", Optics and Precision Engineering, vol. 15, No. 8, pp. 1247-1252, Aug. 2007.
1st Examination Report dated Jun. 24, 2020 for New Zealand Patent Application No. 743271.
Foreign Office Action for CN Patent Appln. No. 201680025479.1 dated Jun. 18 2020.
Notice of Allowance for U.S. Appl. No. 16/220,630 dated Jun. 8, 2020.
Response to Extended European Search Report for European Appln. No. 18767086.4 filed Jun. 15, 2020 (84 pages).
Response to Extended European Search Report for European Appln. No. 18766694.6 filed Jun. 19, 2020 (78 pages).
1st Examiner's Report for AU European Patent Appln. No. 2016225963 dated Jul. 1, 2020.
Foreign Office Action Response for JP Patent Appln. No. 2017-546703 dated Jun. 1, 2020.
Extended European Search Report for EP Patent Appln. No. 18768030.1 dated Jun. 18, 2020.
Mark, W., et al., "Post-Rendering 3D Warping", Proceedings of 1997 Symposium on 3D Graphics, Apr. 27-30, 1997, Providence, RI, USA, pp. 7-ff, XP058285072.
Foreign Exam Report for NZ Patent Appln. No. 735465 dated Jul. 22, 2020.
1st Examination Report for NZ Patent Appln. No. 734200 dated Jun. 15, 2020.
Foreign Submission Reply for EP Patent Appln No. 18766694.6 dated Jun. 19, 2020.
Foreign Examination Report for EP Patent Appln. No. 17837488.0 dated Jul. 22, 2020.
Response to Extended European Search Report for European Appln. No. 18742228.2 dated Aug. 10, 2020 (86 pages).
Notice of Allowance for U.S. Appl. No. 15/923,560 dated Aug. 25, 2020.
Foreign Office Action for KR Patent Appln. No. 10-2019-7006281 dated Aug. 28, 2020.
Non-Final Office Action for U.S. Appl. No. 16/945,613 dated Sep. 3, 2020.
Notice of Allowance for U.S. Appl. No. 16/220,630 dated Sep. 11, 2020.
Foreign Office Action for JP Patent Application No. 2019-505238 dated Sep. 10, 2020 (no translation available).
Notice of Allowance for U.S. Appl. No. 15/369,646 dated Sep. 22, 2020.
Notice of Allowance for U.S. Appl. No. 16/220,630 dated Sep. 23, 2020.
Non-Final Office Action for U.S. Appl. No. 16/809,346 dated Oct. 16, 2020.
1st Examination Report for AU Patent Appl. No. 2017214748 dated Oct. 14, 2020.
Non-Final Office Action for U.S. Appl. No. 16/518,431 dated Oct. 27, 2020.
Foreign Exam Report for EP Patent Appln. No. 18767086.4 dated Sep. 23, 2020.
Foreign Exam Report for EP Patent Appln. No. 18766694.6 dated Sep. 23, 2020.
N Stewart et al: "An improved z-buffer CSG rendering algorithm", Proceedings of the Eurographics / Siggraph Workshop on Graphics Hardware. Lisbon, Aug. 31,-Sep. 1, 1998; pp. 25-30, XP058111343.
Wolberg G et al: "Separable image warping with spatial lookup tables", Computer Graphics, ACM, US, vol. 23, No. 3, Jul. 1, 1989, pp. 369-378, XP058214788.
R T Stevens: "Primitive", In: "Quick Reference to Computer Graphics Terms a Division of Harcourt Brace & Company", Jan. 1, 1995, XP55730228, p. 166.
J D Foley: "The z-buffer algorithm", In: "Computer Graphics—Principles and Practice", Addison-Wesley, Jan. 1, 1990 (Jan. 1, 1990), XP55731635, pp. 668-672.

MIXED REALITY SYSTEM WITH VIRTUAL CONTENT WARPING AND METHOD OF GENERATING VIRTUAL CONTENT USING SAME

CROSS-REFERENCE TO RELATED APPLICATIONS

This application is a continuation of pending U.S. patent application Ser. No. 15/924,011, entitled "MIXED REALITY SYSTEM WITH VIRTUAL CONTENT WARPING AND METHOD OF GENERATING VIRTUAL CONTENT USING SAME," filed Mar. 16, 2018, which claims the benefit of priority to U.S. Provisional Application Ser. No. 62/472,985, filed on Mar. 17, 2017, which is hereby incorporated by reference in its entirety. This application includes subject matter similar to the subject matter described in U.S. Provisional Application Ser. No. 62/473,131, filed on Mar. 17, 2017, which is hereby incorporated by reference in its entirety.

FIELD OF THE INVENTION

The present disclosure relates to mixed reality systems with virtual content warping, and methods for generating a mixed reality experience including warped virtual content using same.

BACKGROUND

Modern computing and display technologies have facilitated the development of "mixed reality" (MR) systems for so called "virtual reality" (VR) or "augmented reality" (AR) experiences, wherein digitally reproduced images, or portions thereof, are presented to a user in a manner wherein they seem to be, or may be perceived as, real. A VR scenario typically involves presentation of digital or virtual image information without transparency to actual real-world visual input. An AR scenario typically involves presentation of digital or virtual image information as an augmentation to visualization of the real-world around the user (i.e., transparency to real-world visual input). Accordingly, AR scenarios involve presentation of digital or virtual image information with transparency to the real-world visual input.

Various optical systems generate images at various depths for displaying MR (VR and AR) scenarios. Some such optical systems are described in U.S. Utility patent application Ser. No. 14/555,585 filed on Nov. 27, 2014, the contents of which are hereby expressly and fully incorporated by reference in their entirety, as though set forth in full.

MR systems typically employ wearable display devices (e.g., head-worn displays, helmet-mounted displays, or smart glasses) that are at least loosely coupled to a user's head, and thus move when the user's head moves. If the user's head motions are detected by the display device, the data being displayed can be updated to take the change in head pose (i.e., the orientation and/or location of user's head) into account.

As an example, if a user wearing a head-worn display device views a virtual representation of a virtual object on the display device and walks around an area where the virtual object appears, the virtual object can be rendered for each viewpoint, giving the user the perception that they are walking around an object that occupies real space. If the head-worn display device is used to present multiple virtual objects, measurements of head pose can be used to render the scene to match the user's dynamically changing head pose and provide an increased sense of immersion. However, there is an inevitable lag between rendering a scene and displaying/projecting the rendered scene.

Head-worn display devices that enable AR provide concurrent viewing of both real and virtual objects. With an "optical see-through" display, a user can see through transparent (or semi-transparent) elements in a display system to view directly the light from real objects in an environment. The transparent element, often referred to as a "combiner," superimposes light from the display over the user's view of the real world, where light from the display projects an image of virtual content over the see-through view of the real objects in the environment. A camera may be mounted onto the head-worn display device to capture images or videos of the scene being viewed by the user.

Current optical systems, such as those in MR systems, optically render virtual content. Content is "virtual" in that it does not correspond to real physical objects located in respective positions in space. Instead, virtual content only exist in the brain (e.g., the optical centers) of a user of the head-worn display device when stimulated by light beams directed to the eyes of user.

MR systems attempt to present photo-realistic, immersive MR scenarios. However, lag time between generation of virtual content and display of the generated virtual content combined with head movement during the lag time can result in visual artifacts (e.g., glitches) in MR scenarios. This problem is exacerbated by rapid head movement during the lag time.

In order to address this issue, some optical systems may include a warping software/system that receives source virtual content from a source. The warping system then "warps" (i.e., transforms the frame of reference of) the received source virtual content for display in a frame of reference of the display system/viewer (the "display frame of reference"). Warping or transforming change the frame of reference from which virtual content is presented. This approach takes the originally rendered virtual content, and shifts the way that the virtual content is presented to attempt to display the virtual content from a different perspective.

Some warping software/systems warp the source virtual content in two processing passes. Warping systems warp all of the source subparts forming a 3-D scenario in the source virtual content in a first pass. The warping systems also perform depth testing in this first pass to generate depth data, but the depth testing is performed in the source frame of reference. The warping systems store all the warped subparts resulting from the transformation of the source subparts forming the 3-D scenario and their relative depths in the source frame of reference in that first pass (e.g., in a list).

During warping, two or more different subparts of a 3-D scenario may warp/project into (i.e., be assigned to) the same pixel of a final display image. These subparts are "conflicting," and the warping system must resolve the conflict to generate a realistic 2-D display image.

After the first pass, some of the warped subparts may be conflicting relative to pixels of the final 2-D display image. The warping systems then perform a second pass through the intermediate warping data stored in the first pass to analyze the depth test data of conflicting warped subparts to identify the warped subparts closest to the viewing location in the output frame of reference. The conflicting warped subpart closest to the viewing location in the output frame of reference is used to generate a final 2-D display image. The remaining conflicting warped subparts are discarded. However, this multi-pass system for warping virtual content from a source may be computationally expensive (resulting in processor/memory related system limitations) and time-consuming (resulting in system latency).

SUMMARY

In one embodiment, a computer implemented method for warping virtual content includes generating warped virtual content by transforming source virtual content. The method also includes determining whether a memory location corresponding to an X, Y location of the warped virtual content in an output frame of reference is occupied by pre-existing virtual content. The method further includes storing the warped virtual content in the memory location if the memory location is not occupied by pre-existing virtual content. Moreover, the method includes comparing respective Z locations of the warped virtual content and the pre-existing virtual content to identify virtual content with a Z location closer to a viewing location in the output frame of reference if the memory location is occupied by pre-existing virtual content. In addition, the method includes storing the warped virtual content in the memory location corresponding to the X, Y location if a Z location of the warped virtual content is closer to the viewing location than a pre-existing Z location of the pre-existing virtual content in the output frame of reference.

In one or more embodiments, the also includes discarding the warped virtual content if the pre-existing Z of the pre-existing virtual content is closer to the viewing location that the Z location of the warped virtual content in the output frame of reference. Generating the warped virtual content, determining whether the memory location is occupied, comparing respective Z locations if the memory location is occupied, and storing the warped virtual content in the memory may all occur in one pass.

In one or more embodiments, transforming the virtual content includes generate a pixel map by mapping pixels of an image. Transforming may also include dividing the pixel map into a plurality of primitives. Transforming may further include performing a transformation on one of the plurality of primitives into the output frame of reference. The virtual content may be the one of the plurality of primitives. Each of the plurality of primitives may be a quadrilateral, a triangle, and/or a pixel. The transformation may be a Fourier transformation.

In one or more embodiments, the method also includes generating the source virtual content using a source frame of reference different from the output frame of reference. The virtual content may be transformed from the source frame of reference to the output frame of reference. The respective Z locations may be in the output frame of reference different from a source frame of reference used to generate the virtual content.

In one or more embodiments, the virtual content includes image information and a source X, Y location in a source frame of reference. The image information may include a brightness, a color, and/or a Z location in the source frame of reference. The warped virtual content may include an output X, Y location in the output frame of reference.

In another embodiment, a system for warping virtual content includes an input memory to store source virtual content. The system also includes a command processor to divide the source virtual content into a plurality of scheduling units. The system further includes a scheduler to determining a processing sequence. Moreover, the system includes a GPU core, the GPU core having a plurality of shader cores to process one of the plurality of scheduling units to generate warped virtual content. In addition, the system includes a FIFO memory to store output from the GPU core. The system also includes a ROP to rasterize the warped virtual content for display. The system further includes a buffer memory to temporarily store the warped virtual content. When pre-existing virtual content temporality stored in the buffer memory conflicts with the warped virtual content, the ROP compares respective Z locations of the pre-existing virtual content and the warped virtual content.

In one or more embodiments, the source virtual content includes a source X, Y value in a source frame of reference. The warped virtual content may include an output X, Y value in an output frame of reference.

In still another embodiment, a computer program product is embodied in a non-transitory computer readable medium, the computer readable medium having stored thereon a sequence of instructions which, when executed by a processor causes the processor to execute a method for warping virtual content. The method includes generating warped virtual content by transforming source virtual content. The method also includes determining whether a memory location corresponding to an X, Y location of the warped virtual content in an output frame of reference is occupied by pre-existing virtual content. The method further includes storing the warped virtual content in the memory location if the memory location is not occupied by pre-existing virtual content. Moreover, the method includes comparing respective Z locations of the warped virtual content and the pre-existing virtual content to identify virtual content with a Z location closer to a viewing location in the output frame of reference if the memory location is occupied by pre-existing virtual content. In addition, the method includes storing the warped virtual content in the memory location corresponding to the X, Y location if a Z location of the warped virtual content is closer to the viewing location than a pre-existing Z location of the pre-existing virtual content in the output frame of reference.

In one or more embodiments, the computer programming product is an API.

In yet another embodiment, a system for warping virtual content includes a warping unit to generate warped virtual content. The warping unit includes a pose estimator and a transform unit. The system also includes a compositing unit, including a blending unit. The system further includes a database to temporarily store warped virtual content. When pre-existing virtual content temporality stored in the database conflicts with the warped virtual content, the blending unit of the compositing unit compares respective Z locations of the pre-existing virtual content and the warped virtual content.

Additional and other objects, features, and advantages of the disclosure are described in the detail description, figures and claims.

BRIEF DESCRIPTION OF THE DRAWINGS

The drawings illustrate the design and utility of various embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosures briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings in which.

DETAILED DESCRIPTION

Various embodiments of the disclosure are directed to systems, methods, and articles of manufacture for warping virtual content in a single embodiment or in multiple embodiments. Other objects, features, and advantages of the disclosure are described in the detailed description, figures, and claims.

Various embodiments will now be described in detail with reference to the drawings, which are provided as illustrative examples of the disclosure so as to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

The virtual content warping systems may be implemented independently of mixed reality systems, but some embodiments below are described in relation to AR systems for illustrative purposes only. Further, the virtual content warping systems described herein may also be used in an identical manner with VR systems.

Illustrative Mixed Reality Scenario and System

The description that follows pertains to an illustrative augmented reality system with which the warping system may be practiced. However, it is to be understood that the embodiments also lend themselves to applications in other types of display systems (including other types of mixed reality systems), and therefore the embodiments are not to be limited to only the illustrative system disclosed herein.

Figure 1:
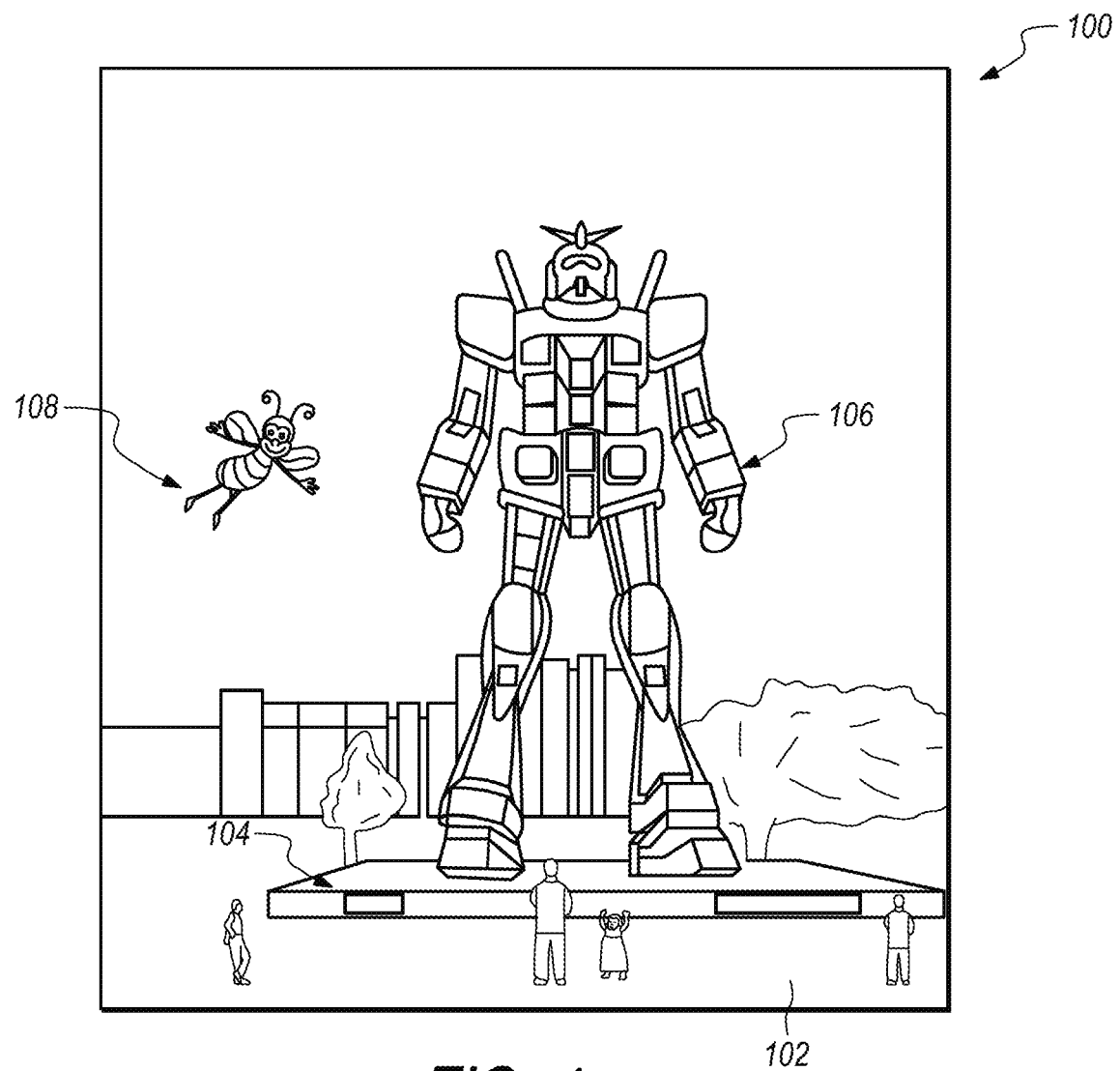
FIG. 1 depicts a user's view of augmented reality (AR) through a wearable AR user device, according to some embodiments.

Mixed reality (e.g., VR or AR) scenarios often include presentation of virtual content (e.g., images and sound) corresponding to virtual objects in relationship to real-world objects. For example, referring to FIG. 1, an augmented reality (AR) scene 100 is depicted wherein a user of AR technology sees a real-world, physical, park-like setting 102 featuring people, trees, buildings in the background, and a real-world, physical concrete platform 104. In addition to these items, the user of the AR technology also perceives that they "see" a virtual robot statue 106 standing upon the physical concrete platform 104, and a virtual cartoon-like avatar character 108 flying by which seems to be a personification of a bumblebee, even though these virtual objects 106, 108 do not exist in the real-world.

Like AR scenarios, VR scenarios also account for the poses used to generate/render the virtual content. Accurately warping the virtual content to the AR/VR display frame of reference and warping the warped virtual content can improve the AR/VR scenarios, or at least not detract from the AR/VR scenarios.

The description that follows pertains to an illustrative AR system with which the disclosure may be practiced. However, it is to be understood that the disclosure also lends itself to applications in other types of augmented reality and virtual reality systems, and therefore the disclosure is not to be limited to only the illustrative system disclosed herein.

Figure 2A:
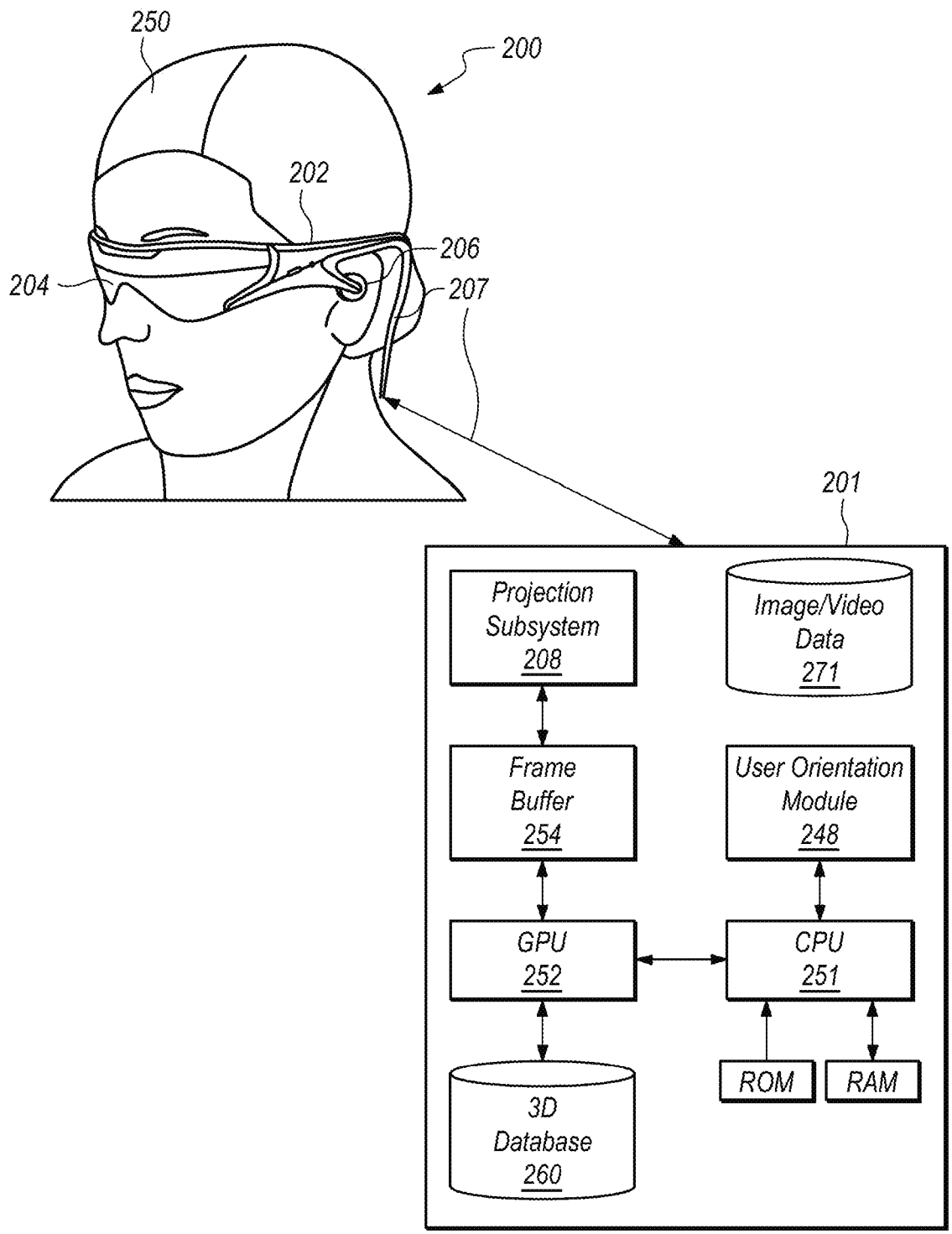
FIGS. 2A-2D schematically depict AR systems and subsystems thereof, according to some embodiments.

FIG. 2A illustrates an augmented reality (AR) system 200, according to some embodiments. The AR system 200 may be operated in conjunction with a projection subsystem 208, providing images of virtual objects intermixed with physical objects in a field of view of a user 250. This approach employs one or more at least partially transparent surfaces through which an ambient environment including the physical objects can be seen and through which the AR system 200 produces images of the virtual objects. The projection subsystem 208 is housed in a control subsystem 201 operatively coupled to a display system/subsystem 204 through a link 207. The link 207 may be a wired or wireless communication link.

For AR applications, it may be desirable to spatially position various virtual objects relative to respective physical objects in the field of view of the user 250. The virtual objects may take any of a large variety of forms, having any variety of data, information, concept, or logical construct capable of being represented as an image. Non-limiting examples of virtual objects may include: a virtual text object, a virtual numeric object, a virtual alphanumeric object, a virtual tag object, a virtual field object, a virtual chart object, a virtual map object, a virtual instrumentation object, or a virtual visual representation of a physical object.

The AR system 200 includes a frame structure 202 worn by the user 250, the display system 204 carried by the frame structure 202, such that the display system 204 is positioned in front of the eyes of the user 250, and a speaker 206 incorporated into or connected to the display system 204. In the illustrated embodiment, the speaker 206 is carried by the frame structure 202, such that the speaker 206 is positioned adjacent (in or around) the ear canal of the user 250 (e.g., an earbud or headphone).

The display system 204 is designed to present the eyes of the user 250 with photo-based radiation patterns that can be comfortably perceived as augmentations to the ambient environment including both two-dimensional and three-dimensional content. The display system 204 presents a sequence of frames at high frequency that provides the perception of a single coherent scene. To this end, the display system 204 includes the projection subsystem 208 and a partially transparent display screen through which the projection subsystem 208 projects images. The display screen is positioned in a field of view of the user's 250 between the eyes of the user 250 and the ambient environment.

In some embodiments, the projection subsystem 208 takes the form of a scan-based projection device and the display screen takes the form of a waveguide-based display into which the scanned light from the projection subsystem 208 is injected to produce, for example, images at single optical viewing distance closer than infinity (e.g., arm's length), images at multiple, discrete optical viewing distances or focal planes, and/or image layers stacked at multiple viewing distances or focal planes to represent volumetric 3D objects. These layers in the light field may be stacked closely enough together to appear continuous to the human visual subsystem (e.g., one layer is within the cone of confusion of an adjacent layer). Additionally or alternatively, picture elements may be blended across two or more layers to increase perceived continuity of transition between layers in the light field, even if those layers are more sparsely stacked (e.g., one layer is outside the cone of confusion of an adjacent layer). The display system 204 may be monocular or binocular. The scanning assembly includes one or more light sources that produce the light beam (e.g., emits light of different colors in defined patterns). The light source may take any of a large variety of forms, for instance, a set of RGB sources (e.g., laser diodes capable of outputting red, green, and blue light) operable to respectively produce red, green, and blue coherent collimated light according to defined pixel patterns specified in respective frames of pixel information or data. Laser light provides high color saturation and is highly energy efficient. The optical coupling subsystem includes an optical waveguide input apparatus, such as for instance, one or more reflective surfaces, diffraction gratings, mirrors, dichroic mirrors, or prisms to optically couple light into the end of the display screen. The optical coupling subsystem further includes a collimation element that collimates light from the optical fiber. Optionally, the optical coupling subsystem includes an optical modulation apparatus configured for converging the light from the collimation element towards a focal point in the center of the optical waveguide input apparatus, thereby allowing the size of the optical waveguide input apparatus to be minimized. Thus, the display system 204 generates a series of synthetic image frames of pixel information that present an undistorted image of one or more virtual objects to the user. Further details describing display subsystems are provided in U.S. Utility patent application Ser. No. 14/212, 961, entitled "Display System and Method", and Ser. No. 14/331,218, entitled "Planar Waveguide Apparatus With Diffraction Element(s) and Subsystem Employing Same", the contents of which are hereby expressly and fully incorporated by reference in their entirety, as though set forth in full.

The AR system 200 further includes one or more sensors mounted to the frame structure 202 for detecting the position (including orientation) and movement of the head of the user 250 and/or the eye position and inter-ocular distance of the user 250. Such sensor(s) may include image capture devices, microphones, inertial measurement units (IMUs), accelerometers, compasses, GPS units, radio devices, gyros, and the like. For example, in one embodiment, the AR system 200 includes a head worn transducer subsystem that includes one or more inertial transducers to capture inertial measures indicative of movement of the head of the user 250. Such devices may be used to sense, measure, or collect information about the head movements of the user 250. For instance, these devices may be used to detect/measure movements, speeds, acceleration and/or positions of the head of the user 250. The position (including orientation) of the head of the user 250 is also known as a "head pose" of the user 250.

The AR system 200 of FIG. 2A may include one or more forward facing cameras. The cameras may be employed for any number of purposes, such as recording of images/video from the forward direction of the system 200. In addition, the cameras may be used to capture information about the environment in which the user 250 is located, such as information indicative of distance, orientation, and/or angular position of the user 250 with respect to that environment and specific objects in that environment.

The AR system 200 may further include rearward facing cameras to track angular position (the direction in which the eye or eyes are pointing), blinking, and depth of focus (by detecting eye convergence) of the eyes of the user 250. Such eye tracking information may, for example, be discerned by projecting light at the end user's eyes, and detecting the return or reflection of at least some of that projected light.

The augmented reality system 200 further includes a control subsystem 201 that may take any of a large variety of forms. The control subsystem 201 includes a number of controllers, for instance one or more microcontrollers, microprocessors or central processing units (CPUs), digital signal processors, graphics processing units (GPUs), other integrated circuit controllers, such as application specific integrated circuits (ASICs), programmable gate arrays (PGAs), for instance field PGAs (FPGAs), and/or programmable logic controllers (PLUs). The control subsystem 201 may include a digital signal processor (DSP), a central processing unit (CPU) 251, a graphics processing unit (GPU) 252, and one or more frame buffers 254. The CPU 251 controls overall operation of the system, while the GPU 252 renders frames (i.e., translating a three-dimensional scene into a two-dimensional image) and stores these frames in the frame buffer(s) 254. While not illustrated, one or more additional integrated circuits may control the reading into and/or reading out of frames from the frame buffer(s) 254 and operation of the display system 204. Reading into and/or out of the frame buffer(s) 254 may employ dynamic addressing, for instance, where frames are over-rendered. The control subsystem 201 further includes a read only memory (ROM) and a random access memory (RAM). The control subsystem 201 further includes a three-dimensional database 260 from which the GPU 252 can access three-dimensional data of one or more scenes for rendering frames, as well as synthetic sound data associated with virtual sound sources contained within the three-dimensional scenes.

The control AR augmented reality subsystem 2010 further includes a user orientation detection module 248. The user orientation module 248 detects an the instantaneous position of the head of the user 250 and may predict a the position of the head of the user 250 based on position data received from the sensor(s). The user orientation module 248 also tracks the eyes of the user 250, and in particular the direction and/or distance at which the user 250 is focused based on the tracking data received from the sensor(s).

Figure 2B:
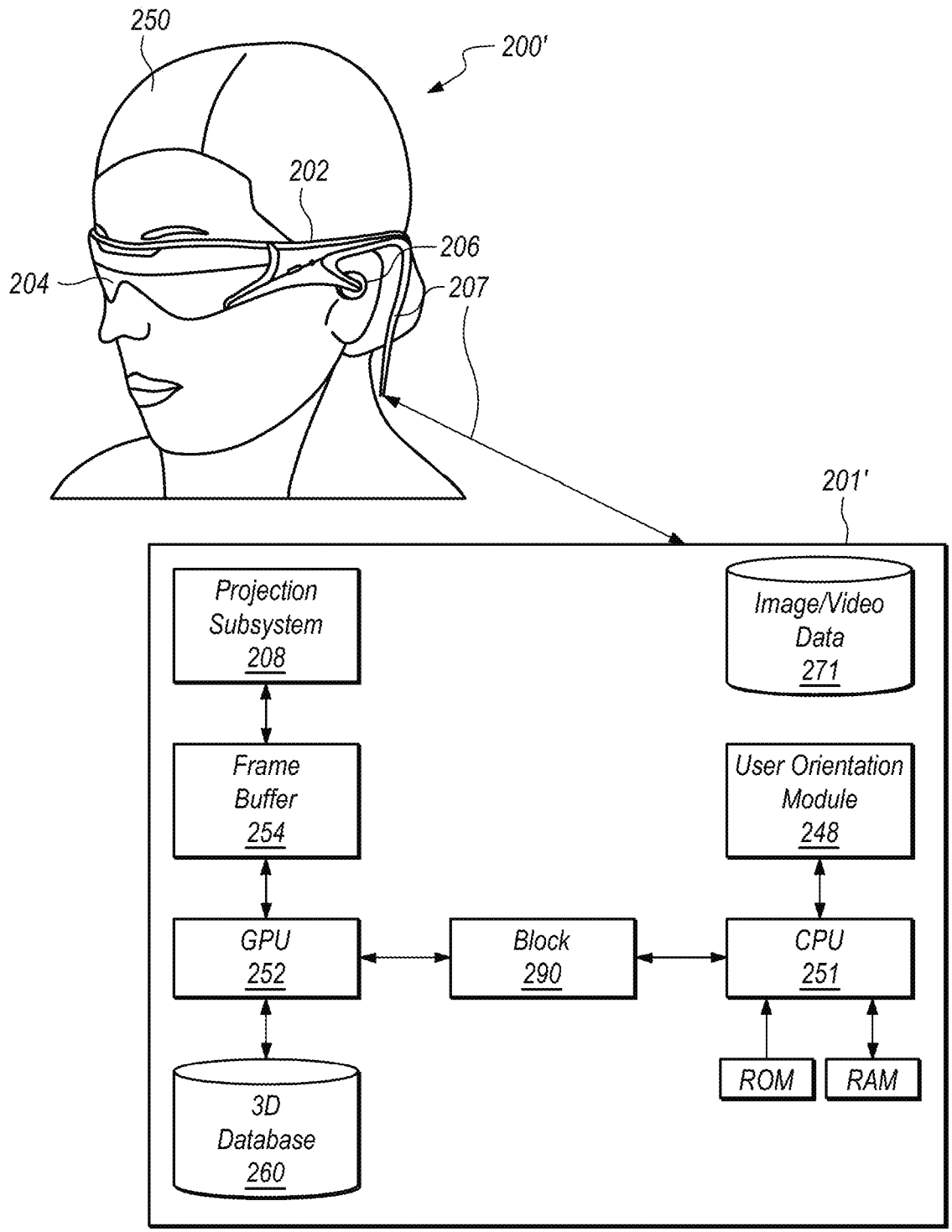

FIG. 2B depicts an AR system 200', according to some embodiments. The AR system 200' depicted in FIG. 2B is similar to the AR system 200 depicted in FIG. 2A and describe above. For instance, AR system 200' includes a frame structure 202, a display system 204, a speaker 206, and a control subsystem 201' operatively coupled to the display system 204 through a link 207. The control subsystem 201' depicted in FIG. 2B is similar to the control subsystem 201 depicted in FIG. 2A and describe above. For instance, control subsystem 201' includes a projection subsystem 208, an image/video database 271, a user orientation module 248, a CPU 251, a GPU 252, a 3D database 260, ROM and RAM.

Figure 2C:
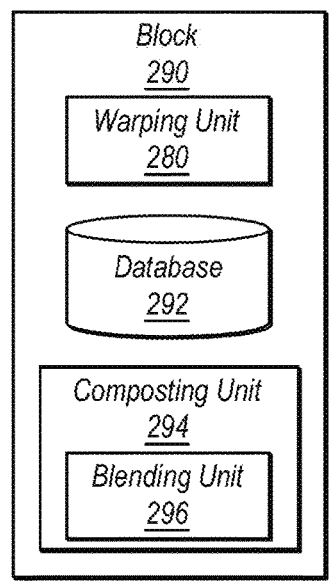
Figure 2D:
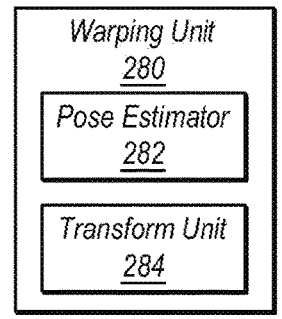

The difference between the control subsystem 201', and thus the AR system 200', depicted in FIG. 2B from the corresponding system/system component depicted in FIG. 2A, is the presence of block 290 in the control subsystem 201' depicted in FIG. 2B. The block 290 is a separate warping block that is independent from either the GPU 252 or the CPU 251. As illustrated in FIG. 2C, the block 290 includes a warping unit 280, a database 292, and a compositing unit 294. The compositing unit 294 includes a blending unit 296. As illustrated in FIG. 2D, the warping unit 280 includes a pose estimator 282 and transform unit 284.

The various processing components of the AR systems 200, 200' may be contained in a distributed subsystem. For example, the AR systems 200, 200' include a local processing and data module (i.e., the control subsystem 201, 201') operatively coupled, such as by a wired lead or wireless connectivity 207, to a portion of the display system 204. The local processing and data module may be mounted in a variety of configurations, such as fixedly attached to the frame structure 202, fixedly attached to a helmet or hat, embedded in headphones, removably attached to the torso of the user 250, or removably attached to the hip of the user 250 in a belt-coupling style configuration. The AR systems 200, 200' may further include a remote processing module and remote data repository operatively coupled, such as by a wired lead or wireless connectivity to the local processing and data module, such that these remote modules are operatively coupled to each other and available as resources to the local processing and data module. The local processing and data module may comprise a power-efficient processor or controller, as well as digital memory, such as flash memory, both of which may be utilized to assist in the processing, caching, and storage of data captured from the sensors and/or acquired and/or processed using the remote processing module and/or remote data repository, possibly for passage to the display system 204 after such processing or retrieval. The remote processing module may comprise one or more relatively powerful processors or controllers configured to analyze and process data and/or image information. The remote data repository may comprise a relatively large-scale digital data storage facility, which may be available through the internet or other networking configuration in a "cloud" resource configuration. In some embodiments, all data is stored and all computation is performed in the local processing and data module, allowing fully autonomous use from any remote modules. The couplings between the various components described above may include one or more wired interfaces or ports for providing wires or optical communications, or one or more wireless interfaces or ports, such as via RF, microwave, and IR for providing wireless communications. In some implementations, all communications may be wired, while in other implementations all communications may be wireless, with the exception of the optical fiber(s).

Summary of Problems and Solutions

Figure 3:
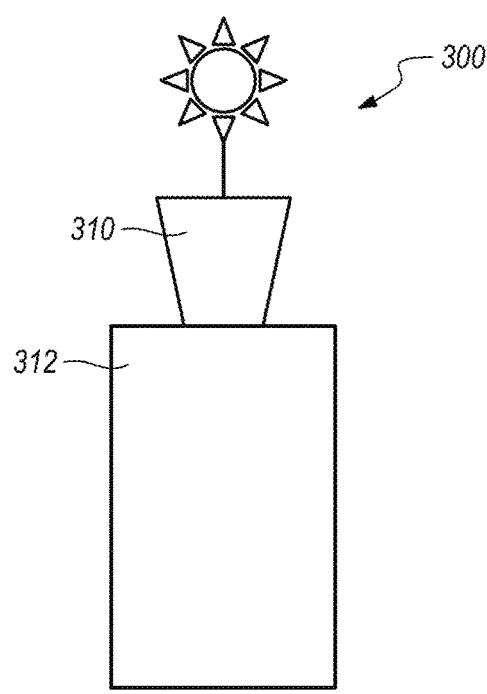
FIGS. 3 and 4 illustrate a rendering artifact with rapid head movement, according to some embodiments.

When an optical system generates/renders virtual content, it may use a source frame of reference that may be related to a pose of the system when the virtual content is rendered. In AR systems, the rendered virtual content may have a predefined relationship with a real physical object. For instance, FIG. 3 illustrates an AR scenario 300 including a virtual flower pot 310 positioned on top of a real physical pedestal 312. An AR system rendered the virtual flower pot 310 based on a source frame of references in which the location of the real pedestal 312 is known such that the virtual flower pot 310 appears to be resting on top of the real pedestal 312. The AR system may, at a first time, render the virtual flower pot 310 using a source frame of reference, and, at a second time after the first time, display/projected the rendered virtual flower pot 310 at an output frame of reference. If the source frame of reference and the output frame of reference are the same, the virtual flower pot 310 will appear where it was intended to be (e.g., on top of the real physical pedestal 312).

Figure 4:
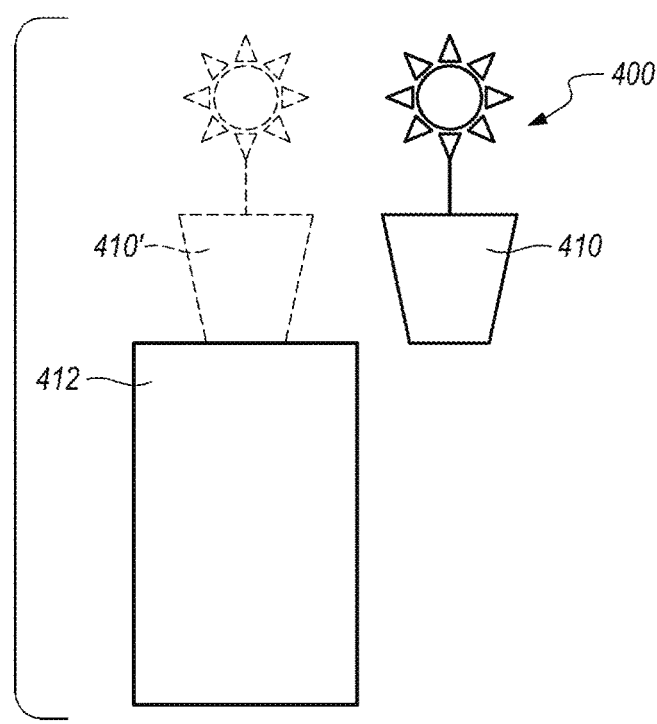

However, if the AR system's frame of reference changes (e.g., with rapid user head movement) in a gap between the first time at which the virtual flower pot 310 is rendered and the second time at which the rendered virtual flower pot 310 is displayed/projected, the mismatch/difference between the source frame of reference and the output frame of reference may result in visual artifacts/anomalies/glitches. For instance, FIG. 4 shows an AR scenario 400 including a virtual flower pot 410 that was rendered to be positioned on top of a real physical pedestal 412. However, because the AR system was (rapidly) moved to the right after the virtual flower pot 410 was rendered but before it was displayed/projected, the virtual flower pot 410 is displayed to the right of its intended position 410' (shown in phantom). As such, the virtual flower pot 410 appears to be floating in midair to the right of the real physical pedestal 412. This artifact will be remedied when the virtual flower pot is re-rendered in the output frame of reference (assuming that the AR system motion ceases). However, the artifact will still be visible to some users with the virtual flower pot 410 appearing to glitch by temporarily jumping to an unexpected position. This glitch and others like it can have a deleterious effect on the illusion of continuity of an AR scenario.

Some optical systems may include a warping system that warps or transforms the frame of reference of source virtual content from the source frame of reference in which the virtual content was generated to the output frame of reference in which the virtual content will be displayed. In the example depicted in FIG. 4, the AR system can detect and/or predict (e.g., using IMUs or eye tracking) the output frame of reference and/or pose. The AR system can then warp or transform the rendered virtual content from the source frame of reference into warped virtual content in the output frame of reference.

Figure 5:
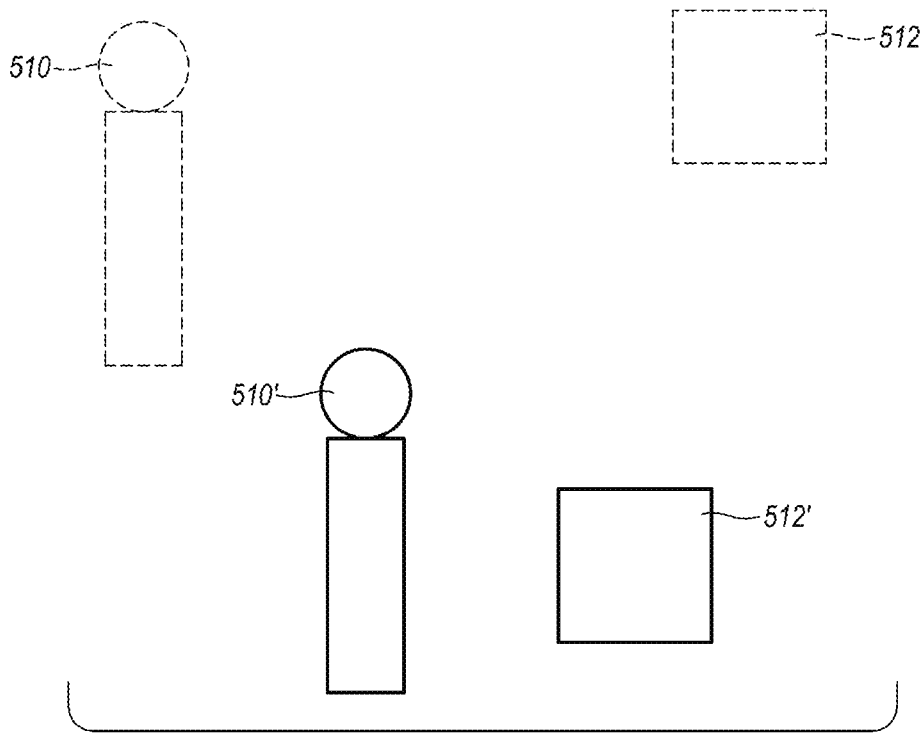
FIGS. 5-8 illustrate various aspects of warping virtual content, according to some embodiments.

Some warping software/systems warp the source virtual content in two processing passes. Referring the example in FIGS. 5-7, an AR system warps all source subparts forming a 3-D scenario (e.g., primitives forming a chess piece 510 and a cube 512) in source virtual content in a first pass. The first pass forms warped virtual content (e.g., a warped chess piece 510' and a warped cube 512'). The chess piece 510 and the cube 512 are shown in phantom in FIGS. 5-7 to indicate that they are in the source frame of reference, and will not be displayed. Instead, the warped chess piece 510' and the warped cube 512' (shown in solid lines) in the output frame of reference will be displayed. Some warping systems also depth test all the subparts (e.g., each primitive forming the warped chess piece 510' and the warped cube 512') in the first pass to generate depth data. After depth testing, the AR system stores all the warped subparts (e.g., primitives) and their relative depths in the source frame of reference in the first pass (e.g., in a list). At the end of the first pass, warped virtual content may be stored as a list of all brightnesses/ colors at each X, Y position (e.g., pixel) in the output virtual content, including all instances of conflicting warped virtual data.

Figure 6:
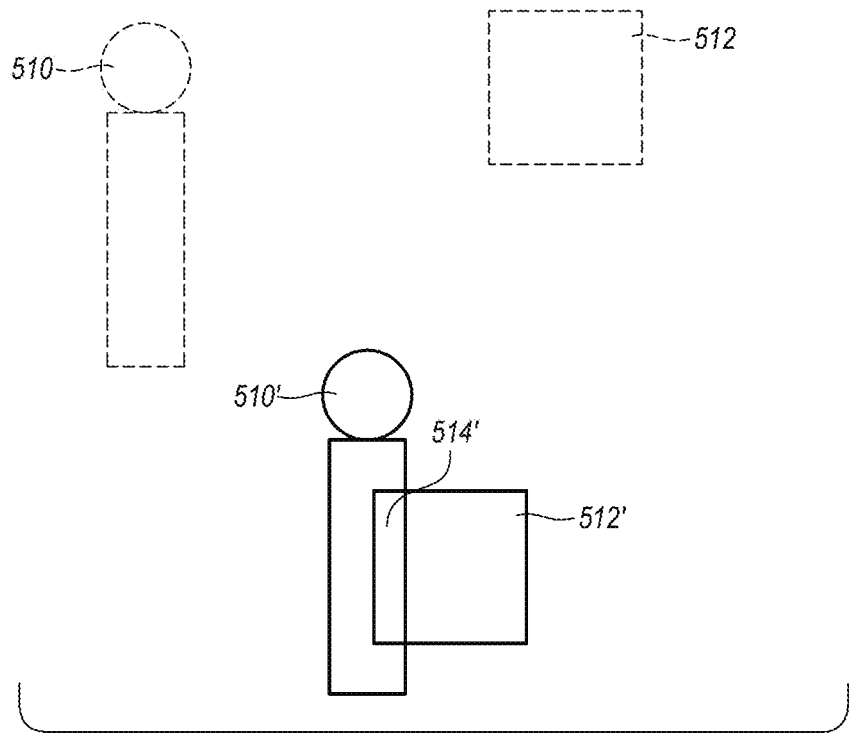

The warping systems then resolves all conflicting virtual data at each X, Y position of the stored warped subparts and relative depths (e.g., the list) in a second pass. When two or more different subparts of a 3-D scenario (e.g., the chess piece 510 and the cube 512) are warped into an output frame of reference (e.g., the warped chess piece 510' and the warped cube 512'), portions of these subparts may warp/project into (i.e., be assigned to) a same pixel of a final display image. For instance, area 514 in FIG. 6 represents "conflicting" portions of the warped chess piece 510' and the warped cube 512'. The warping system resolves/reconciles these conflicting portions of the warped virtual content when generating output virtual content.

In some embodiments, if respective pixels of the warped chess piece 510' and the warped cube 512' (e.g., first and second virtual content) would be displayed on the same pixel of the display (i.e., colliding pixels), the warping system can compare the stored depth data corresponding to the respective colliding/conflicting pixel. The colliding pixel (e.g., warped virtual content) closer to a viewing location in the output frame of reference is displayed (assuming that the content is opaque). The colliding pixel closest to the viewing location in the output frame of reference is used to generate a final display image. The remaining colliding pixels are discarded.

Figure 7:
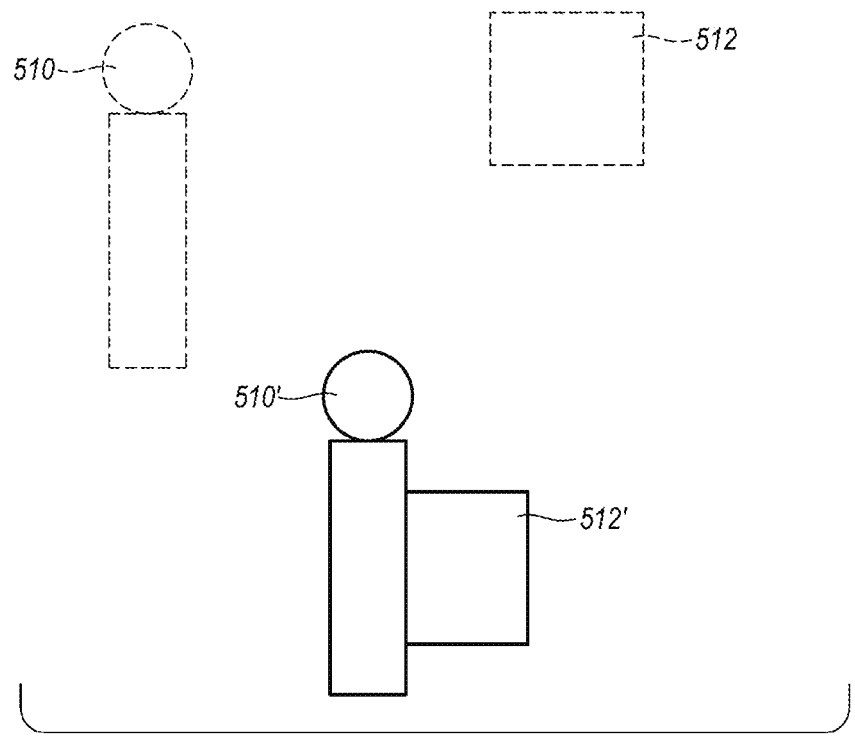
Figure 8:
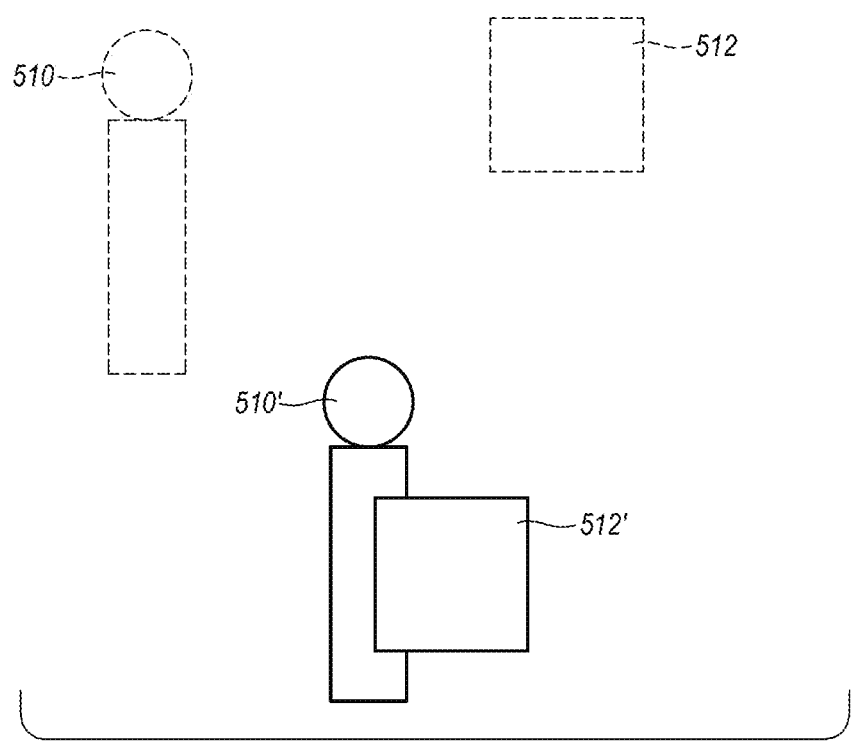

In one instance shown in FIG. 7, the warped chess piece 510' is closer to the user than the warped cube 512'. As such, when pixels of the warped chess piece 510' and the warped cube 512' collide, the pixels of the warped chess piece 510' are displayed in the output content. In another instance shown in FIG. 8, the warped cube 512' is closer to the user than the warped chess piece 510'. As such, when pixels of the warped chess piece 510' and the warped cube 512' collide, the pixels of the warped cube 512' are displayed in the output content. Because some warping systems generate depth data in the source frame of reference, the depth comparison in the second pass involves multiple transformations and is more complicated than a direct comparison.

This two-pass system warps virtual content and resolves colliding/conflicting warped virtual content for display (e.g., in a realistic AR scenario). However, this two-pass warping system is computationally expensive (resulting in processor/memory related system limitations) and time-consuming (resulting in system latency). The computational expense and time required increases with the complexity of the 3-D scenario that must be warped for display. The increased time requirements of current warping software/systems with increasing scenario complexity may not be compatible with real-time systems such as some mixed reality systems. Further, the increased computational expense of some warping software/systems with increasing scenario complexity may manifest in size, power, heat and other processing related limitations that may not be compatible with portable systems such as some mixed reality systems.

In order to address these limitations, the systems described herein warp virtual content and reconcile conflicting virtual content in a single pass. The virtual content is warped based on the source frame of reference to the display frame of reference. Reconciling conflicting warped virtual content includes depth testing of all warped virtual content in a particular pixel of output virtual content for display. Unlike some warping systems, the depth testing according to embodiments herein take place in the output frame of reference.

Illustrative Graphics Processing Unit

Figure 9:
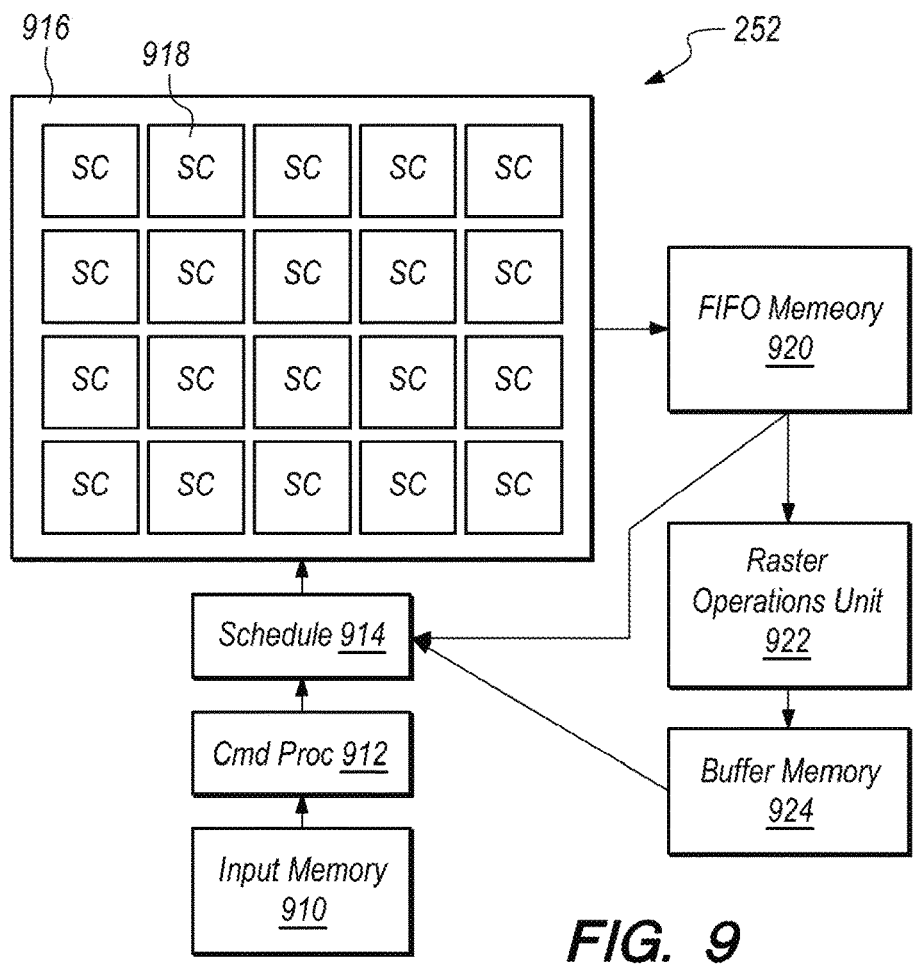
FIG. 9 schematically depicts a graphics processing unit (GPU), according to some embodiments.
Figure 10:
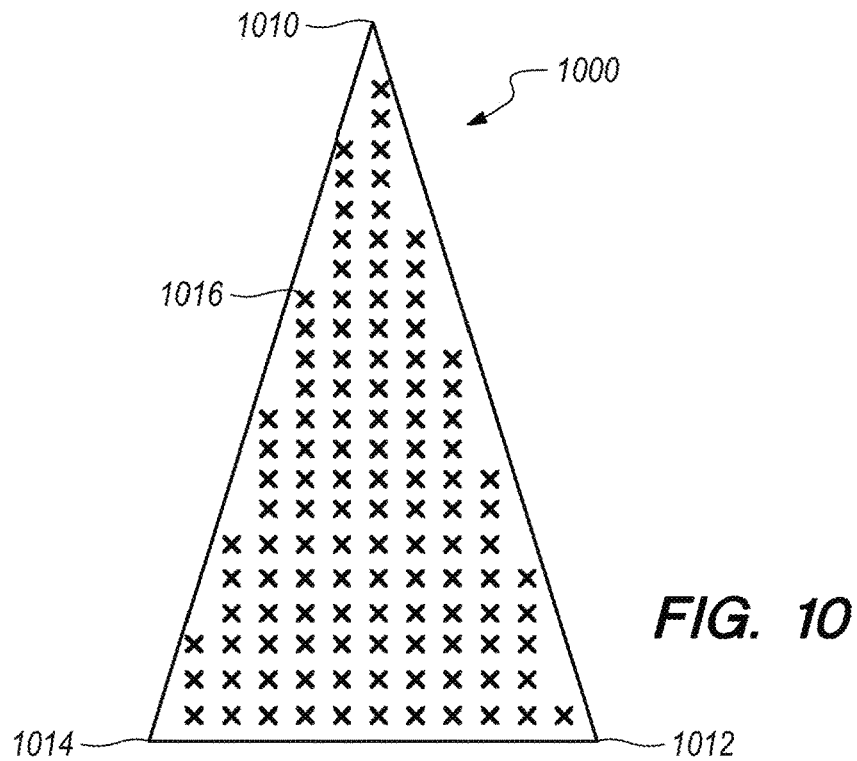
FIG. 10 depicts a virtual object stored as a primitive, according to some embodiments.

FIG. 9 schematically depicts an exemplary graphics processing unit (GPU) 252 to warp virtual content to an output frame of reference and to reconcile conflicting portions of the warped virtual content, according to some embodiments. The GPU 252 includes an input memory 910 to store the generated virtual content to be warped. In some embodiments, the virtual content is stored as a primitive (e.g., a triangle 1000 in FIG. 10). The GPU 252 also includes a command processor 912, which (1) receives/reads the virtual content from the input memory 910, (2) divides the virtual content into scheduling units, and (3) sends the scheduling units along the rendering pipeline in waves or warps for parallel processing. The GPU 252 further includes a scheduler 914 to (1) receive the scheduling units from the command processor 912, and (2) determine whether the "new work" from the command processor 912 or "old work" returning from downstream in the rendering pipeline (described below) should be sent down the rendering pipeline at any particular time. In effect, the scheduler 914 determines the sequence in which the GPU 252 processes various input data.

The GPU 252 includes one or more GPU cores 916, where each GPU core 916 has a number of parallel executable cores/units ("shader cores") 918 for processing the scheduling units in parallel. The command processor 912 divides the virtual content into a number equal to the number of shader cores 918 (e.g., 32). The GPU 252 also includes a "First In First Out" ("FIFO") memory 920 to receive output from the GPU core 916. From the FIFO memory 920, the output may be routed back to the scheduler 914 as "old work" for insertion into the rendering pipeline additional processing by the GPU core 916.

The GPU 252 further includes a Raster Operations Unit ("ROP") 922 that receives output from the FIFO memory 920 and rasterizes the output for display. For instance, primitives of virtual content may be stored as the coordinates of vertices of triangles. After processing by the GPU core 916 (during which the three vertices 1010, 1012, 1014 of the triangle 1000 of FIG. 10 may be warped), the ROP 922 determines which pixels 1016 are inside of the triangle 1000 defined by three vertices 1010, 1012, 1014 and fills in those pixels 1016 in the virtual content. The ROP 922 may also perform depth testing on the virtual content.

The GPU 252 also includes a buffer memory 924 for temporarily storing warped virtual content from the ROP 922. The warped virtual content in the buffer memory 924 may include brightness/color and depth information at a plurality of X, Y positions in a field of view in an output frame of reference. The output from the buffer memory 924 may be routed back to the scheduler 914 as "old work" for insertion into the rendering pipeline additional processing by the GPU core 916, or for display in the corresponding pixels of a display system. The GPU cores 916 first processes the vertices 1010, 1012, 1014 of the triangles 1000, then it processes the pixels 1016 inside of the triangles 1000. When all the fragments of virtual content in the input memory 910 have been warped and depth tested (if necessary), the buffer memory 924 will include all of the brightness/color and depth information needed to display a field of view in an output frame of reference.

Virtual Content Warping Systems and Methods

In image processing without head pose changes, the results of the processing by the GPU 252 are color/brightness values and depth values at respective X, Y values (e.g., at each pixel). However with head pose changes, different portions of virtual content viewed from a viewing location in an output frame of reference different from a source frame of reference in which the virtual content was generated may overlap at a pixel. In some methods for warping virtual content and resolving conflicting virtual content, all virtual content that may occupy each X, Y position in the output virtual content is warped (from the source frame of reference) and stored (e.g., in a list). The stored virtual content includes color/brightness and depth information. Then the depths of any conflicting virtual content are compared to each other to determine the virtual content closest to the viewing location in the output frame of reference, which is used in the output virtual content. As described above, this multi-pass warping process may be computationally expensive and slow, making it difficult to use with portable display systems, such as mixed reality systems.

Figure 11:
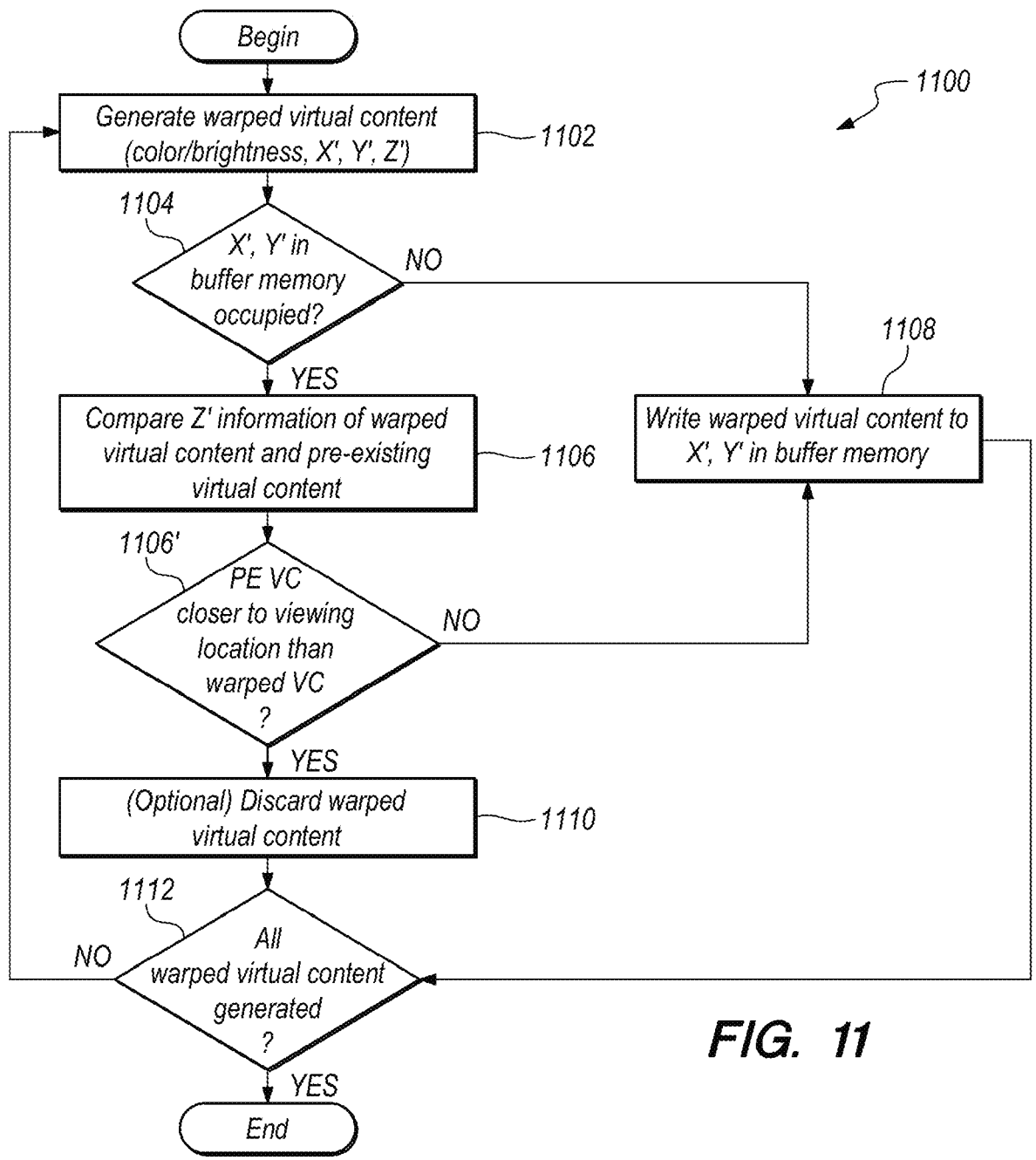
FIG. 11 depicts a method for warping virtual content, according to some embodiments.

FIG. 11 depicts a method 1100 for warping virtual content and resolving conflicting virtual content in a single pass, according to some embodiments. At step 1102, a warping system (e.g., a GPU core 916 of a GPU 252 and/or a pose estimator 282 and transform unit 284 of a warping unit 280 of block 290) generates warped virtual content (having X', Y', and Z' locations in an output frame of reference) from source virtual content (having X, Y, and Z locations in a source frame of reference). The warped virtual content may be a warped primitive represented by information including color/brightness, X', Y', and Z' locations in the output frame of reference. The X', Y', and Z' values are calculated relative to a viewing location in the output frame of reference. In some embodiments, the warped virtual content may correspond to a portion of a chess piece 510' as shown in FIGS. 5-8.

At step 1104, the warping system (e.g., a ROP 922 of a GPU 252 and/or a compositing unit 294 and blending unit 296 of block 290) determines whether the X', Y' location of the buffer memory 924 and/or database 292 corresponding to the X', Y' location of the warped virtual content is occupied by pre-existing virtual content that was stored in the buffer memory 924 and/or database 292 before the current warped virtual content was generated. For instance, a portion 514' of the warped virtual content 510', 512' in FIGS. 6-8 contains conflicting warped virtual content. If the X', Y' location of the buffer memory 924 and/or database 292 is occupied by pre-existing virtual content, the method 1100 proceeds to steps 1106/1106'.

If the X', Y' location of the buffer memory 924 and/or database 292 is determined to be not occupied in step 1104, the warping system (e.g., the ROP 922 of a GPU 252 and/or a compositing unit 294 and blending unit 296 of block 290) writes the warped virtual content (including brightness/color and Z' information) in the X', Y' location of the buffer memory 924 and/or database 292 in step 1108. The method 1100 then proceeds to step 1112.

At step 1112, the warping system determines whether all warped virtual content has been generated. If all warped virtual content has been generated, the method 1100 is ended and the warped virtual content stored in the buffer memory 924 and/or database 292 can be displayed. If all warped virtual content has not been generated, the method 1100 returns to step 1102 to generate more warped virtual content.

At steps 1106/1106', the warping system (e.g., the ROP 922 of a GPU 252 and/or a compositing unit 294 and blending unit 296 of block 290) compares the Z' (e.g., depth) information of the warped virtual content and the pre-existing virtual content in the X', Y' location of the buffer memory 924 and/or database 292 to determine which virtual content is closer to a viewing location in the output frame of reference. Because the Z' information is in the output frame of reference, the comparison is straightforward. If the warping system determines that the pre-existing virtual content is closer to the viewing location than the warped virtual content, the method 1100 proceeds to step 1110.

At step 1110, the warping system (e.g., the ROP 922 of a GPU 252 and/or a compositing unit 294 and blending unit 296 of block 290) optionally discards the warped virtual content, which will not be visible from the viewing location because it will be obstructed by the closer pre-existing virtual content (assuming that the pre-existing virtual content is opaque).

At step 1112, the warping system (e.g., the ROP 922 of a GPU 252 and/or a compositing unit 294 and blending unit 296 of block 290) determines whether all warped virtual content has been generated. If all warped virtual content has been generated, the method 1100 is ended and the warped virtual content stored in the buffer memory 924 can be displayed. If all warped virtual content has not been generated, the method 1100 returns to step 1102 to generate more warped virtual content.

If the warping system (e.g., the ROP 922 of a GPU 252 and/or a compositing unit 294 and blending unit 296 of block 290) determines that the warped virtual content is closer to the viewing location than the pre-existing virtual content, the warping system (e.g., the ROP 922 of a GPU 252 and/or a compositing unit 294 and blending unit 296 of block 290) writes the warped virtual content (including brightness/color and Z' information) in the X', Y' location of the buffer memory 924 and/or database 292 in step 1108. In writing the warped virtual content in the X', Y' location, the pre-existing virtual content previously stored in the X', Y' location will be discarded. The method 1100 then proceeds to step 1112.

At step 1112, the warping system (e.g., the ROP 922 of a GPU 252 and/or a compositing unit 294 and blending unit 296 of block 290) determines whether all warped virtual content has been generated. If all warped virtual content has been generated, the method 1100 is ended and the warped virtual content stored in the buffer memory 924 can be displayed. If all warped virtual content has not been generated, the method 1100 returns to step 1102 to generate more warped virtual content.

Warping virtual content and resolving conflicting warped virtual content in a single pass reduces the processor burden and the time required to warp virtual content to form output content for display. The method 1100 depicted in FIG. 11 may be embodied as a "shader extension" or an Application Program Interface ("API") executed on a GPU 252. As described above, the method 1100 depicted in FIG. 11 may also be executed on a separate warping block 290 that is independent from either any GPU 252 or CPU 251. In still another embodiment, the method 1100 depicted in FIG. 11 may be executed on a CPU 251. In yet other embodiments, the method 1100 depicted in FIG. 11 may be executed on various combinations/sub-combinations of GPU 252, CPU 251, and separate warping block 290. The method 1100 depicted in FIG. 11 is an image processing pipeline that can be executed using various execution models according to system resource availability at a particular time.

The chess piece 510 and the cube 512 are shown in phantom in FIGS. 5-8 to indicate that the chess piece 510 and the cube 512 as generated in the source frame of reference and not in the display frame of reference. Only after the warping system has warped the chess piece 510 and the cube 512 are the warped chess piece 510' and the warped cube 512' shown in solid lines.

System Architecture Overview

Figure 12:
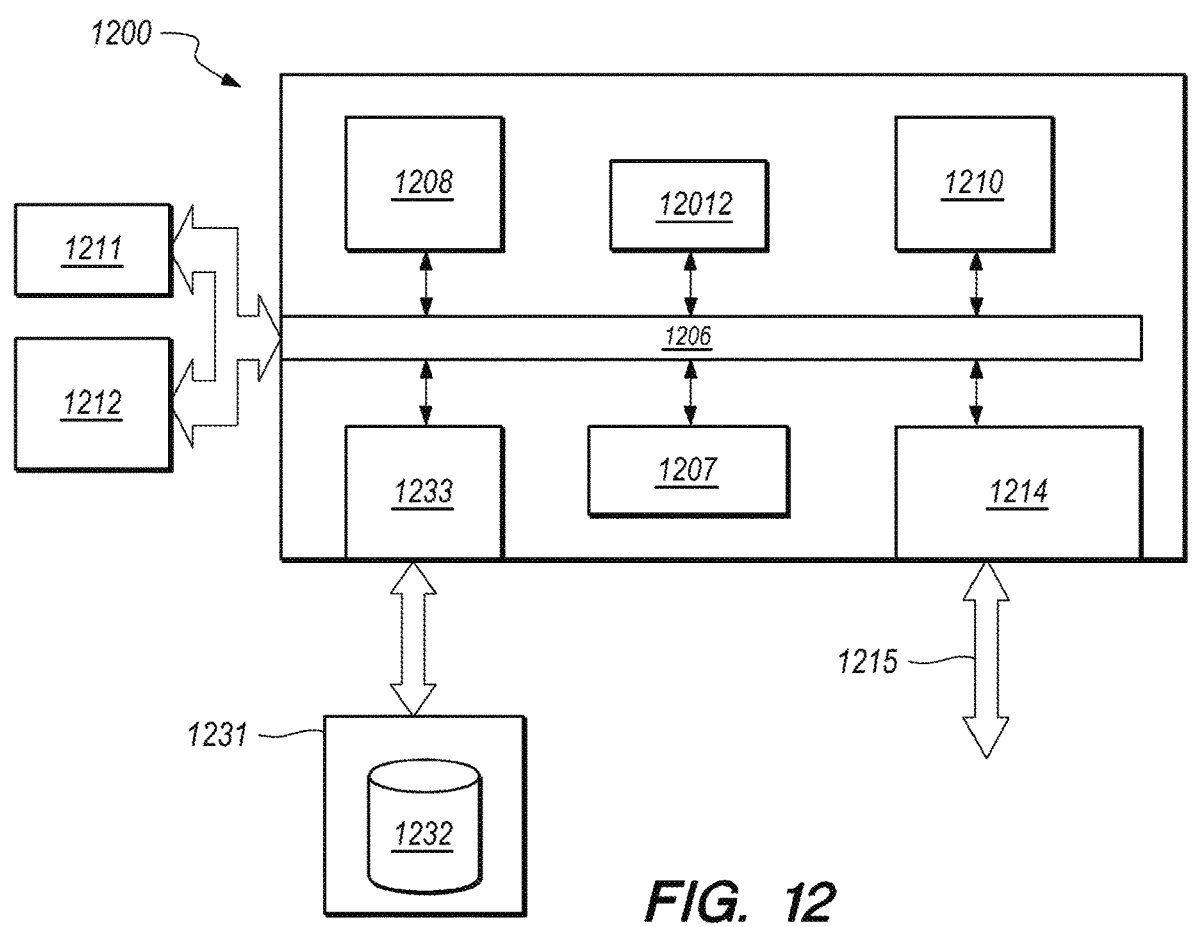
FIG. 12 is a block diagram schematically depicting an illustrative computing system, according to some embodiments.

FIG. 12 is a block diagram of an illustrative computing system 1200 suitable for implementing an embodiment of the present disclosure. Computer system 1200 includes a bus 1206 or other communication mechanism for communicating information, which interconnects subsystems and devices, such as processor 1207, system memory 1208 (e.g., RAM), static storage device 1209 (e.g., ROM), disk drive 1210 (e.g., magnetic or optical), communication interface 1214 (e.g., modem or Ethernet card), display 1211 (e.g., CRT or LCD), input device 1212 (e.g., keyboard), and cursor control.

According to one embodiment of the disclosure, computer system 1200 performs specific operations by processor 1207 executing one or more sequences of one or more instructions contained in system memory 1208. Such instructions may be read into system memory 1208 from another computer readable/usable medium, such as static storage device 1209 or disk drive 1210. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 1207 for execution. Such a medium may take many forms, including but not limited to, non-volatile media and volatile media. Non-volatile media includes, for example, optical or magnetic disks, such as disk drive 1210. Volatile media includes dynamic memory, such as system memory 1208.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM (e.g., NAND flash, NOR flash), any other memory chip or cartridge, or any other medium from which a computer can read.

In an embodiment of the disclosure, execution of the sequences of instructions to practice the disclosure is performed by a single computer system 1200. According to other embodiments of the disclosure, two or more computer systems 1200 coupled by communication link 1215 (e.g., LAN, PTSN, or wireless network) may perform the sequence of instructions required to practice the disclosure in coordination with one another.

Computer system 1200 may transmit and receive messages, data, and instructions, including program, i.e., application code, through communication link 1215 and communication interface 1214. Received program code may be executed by processor 1207 as it is received, and/or stored in disk drive 1210, or other non-volatile storage for later execution. Database 1232 in storage medium 1231 may be used to store data accessible by system 1200 via data interface 1233.

The disclosure includes methods that may be performed using the subject devices. The methods may comprise the act of providing such a suitable device. Such provision may be performed by the user. In other words, the "providing" act merely requires the user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the disclosure, together with details regarding material selection and manufacture have been set forth above. As for other details of the present disclosure, these may be appreciated in connection with the above-referenced patents and publications as well as generally known or appreciated by those with skill in the art. The same may hold true with respect to method-based aspects of the disclosure in terms of additional acts as commonly or logically employed.

In addition, though the disclosure has been described in reference to several examples optionally incorporating various features, the disclosure is not to be limited to that which is described or indicated as contemplated with respect to each variation of the disclosure. Various changes may be made to the disclosure described and equivalents (whether recited herein or not included for the sake of some brevity) may be substituted without departing from the true spirit and scope of the disclosure. In addition, where a range of values is provided, it is understood that every intervening value, between the upper and lower limit of that range and any other stated or intervening value in that stated range, is encompassed within the disclosure.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present disclosure is not to be limited to the examples provided and/or the subject specification, but rather only by the scope of claim language associated with this disclosure.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

The invention claimed is:

1. A computer implemented method for warping virtual content:
   generating warped virtual content;
   determining whether a memory location corresponding to an X, Y location of the warped virtual content in an output frame of reference is occupied by pre-existing virtual content;
   comparing respective Z locations of the warped virtual content and the pre-existing virtual content to identify virtual content with a Z location closer to a viewing location in the output frame of reference if the memory location is occupied by the pre-existing virtual content; and
   storing the warped virtual content in the memory location corresponding to the X, Y location if a Z location of the warped virtual content is closer to the viewing location than a pre-existing Z location of the pre-existing virtual content in the output frame of reference,
   wherein generating the warped virtual content, determining whether the memory location is occupied, comparing the respective Z locations of the warped virtual content and the pre-existing virtual content if the memory location is occupied, and storing the warped virtual content in the memory location all occur in a single pass.

2. The method of claim 1, further comprising discarding the warped virtual content if the pre-existing Z location of the pre-existing virtual content is closer to the viewing location than the Z location of the warped virtual content in the output frame of reference.

3. The method of claim 1, wherein the warped virtual content is a quadrilateral.

4. The method of claim 1, wherein the warped virtual content is a triangle.

5. The method of claim 1, wherein the warped virtual content is a pixel.

6. The method of claim 1, wherein the warped virtual content is generated from source virtual content, the method further comprising generating the source virtual content using a source frame of reference different from the output frame of reference.

7. The method of claim 6, wherein the source virtual content is transformed from the source frame of reference to the output frame of reference.

8. The method of claim 7, wherein the respective Z locations of the warped virtual content and the pre-existing virtual content in the output frame of reference are different from corresponding Z locations of the warped virtual content and the pre-existing virtual content in the source frame of reference.

9. The method of claim 6, wherein the source virtual content comprises image information and a source X, Y location in the source frame of reference.

10. The method of claim 9, wherein the image information comprises a brightness.

11. The method of claim 9, wherein the image information comprises a color.

12. The method of claim 9, wherein the image information comprises a Z location in the source frame of reference.

13. The method of claim 9, wherein the warped virtual content comprises an output X, Y location in the output frame of reference.

14. A system for warping virtual content, comprising:
    a graphics processing unit (GPU) core to generate warped virtual content;
    a raster operations processor (ROP) to rasterize the warped virtual content for display; and
    a buffer memory to temporarily store the warped virtual content,
    wherein when pre-existing virtual content temporarily stored in the buffer memory conflicts with the warped virtual content, the ROP compares respective Z locations of the pre-existing virtual content and the warped virtual content and writes the warped virtual content in the buffer memory when a Z location of the warped virtual content is closer to a viewing location than a pre-existing Z location of the pre-existing virtual content, and
    wherein the following occur in a single pass:
    the GPU generates the warped virtual content,
    the ROP determines whether the pre-existing virtual content conflicts with the warped virtual content,
    the ROP compares the respective Z locations of the pre-existing virtual content and the warped virtual content if the pre-existing virtual content conflicts with the warped virtual content, and
    the ROP writes the warped virtual content in the buffer memory when the Z location of the warped virtual content is closer to the viewing location than the pre-existing Z location of the pre-existing virtual content.

15. The system of claim 14, wherein the GPU generates the warped virtual content from source virtual content, and wherein the source virtual content comprises a source X, Y value in a source frame of reference.

16. The system of claim 15, wherein the warped virtual content comprises an output X, Y value in an output frame of reference.

17. The system of claim 16, wherein the respective Z locations of the warped virtual content and the pre-existing virtual content in the output frame of reference are different from corresponding Z locations of the warped virtual content and the pre-existing virtual content in the source frame of reference.

18. The system of claim 15, wherein the source virtual content comprises image information and a source X, Y location in the source frame of reference.

19. The system of claim 18, wherein the image information comprises, a brightness, a color, or a Z location in the source frame of reference.

20. A computer program product embodied in a non-transitory computer readable medium, the non-transitory computer readable medium having stored thereon a sequence of instructions which, when executed by a processor causes the processor to execute a method for warping virtual content, the method comprising:
    generating warped virtual content;
    determining whether a memory location corresponding to an X, Y location of the warped virtual content in an output frame of reference is occupied by pre-existing virtual content;
    comparing respective Z locations of the warped virtual content and the pre-existing virtual content to identify virtual content with a Z location closer to a viewing location in the output frame of reference if the memory location is occupied by the pre-existing virtual content; and
    storing the warped virtual content in the memory location corresponding to the X, Y location if a Z location of the warped virtual content is closer to the viewing location than a pre-existing Z location of the pre-existing virtual content in the output frame of reference,
wherein generating the warped virtual content, determining whether the memory location is occupied, comparing the respective Z locations of the warped virtual content and the pre-existing virtual content if the memory location is occupied, and storing the warped virtual content in the memory location all occur in a single pass.

\* \* \* \* \*